US012284563B2

(12) United States Patent
Youn et al.

(10) Patent No.: US 12,284,563 B2
(45) Date of Patent: Apr. 22, 2025

(54) METHOD AND APPARATUS FOR TRANSMITTING AND RECEIVING SIGNALS IN WIRELESS COMMUNICATION SYSTEM

(71) Applicant: LG ELECTRONICS INC., Seoul (KR)

(72) Inventors: Myungjune Youn, Seoul (KR); Hyun Sook Kim, Seoul (KR); Lae Young Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 342 days.

(21) Appl. No.: 17/998,548

(22) PCT Filed: May 13, 2021

(86) PCT No.: PCT/KR2021/006008
§ 371 (c)(1),
(2) Date: Nov. 11, 2022

(87) PCT Pub. No.: WO2021/230679
PCT Pub. Date: Nov. 18, 2021

(65) Prior Publication Data
US 2023/0209431 A1    Jun. 29, 2023

(30) Foreign Application Priority Data

May 15, 2020  (KR) .................. 10-2020-0058549
Aug. 24, 2020  (KR) .................. 10-2020-0106403
Sep. 29, 2020  (KR) .................. 10-2020-0127331

(51) Int. Cl.
*H04W 36/26*    (2009.01)
*H04W 8/08*    (2009.01)
(Continued)

(52) U.S. Cl.
CPC ........... *H04W 36/26* (2013.01); *H04W 8/082* (2013.01); *H04W 28/24* (2013.01); *H04W 60/04* (2013.01); *H04W 84/042* (2013.01)

(58) Field of Classification Search
CPC ..... H04W 36/26; H04W 8/082; H04W 28/24; H04W 60/04; H04W 484/042
(Continued)

(56) References Cited

U.S. PATENT DOCUMENTS 10,517,021 B2 * 12/2019 Feldman ............. H04L 65/1073
2020/0259896 A1 * 8/2020 Sachs ................ H04W 56/0065
(Continued)

FOREIGN PATENT DOCUMENTS

KR    10-2056919    12/2019
KR    10-2020-0049760    5/2020
(Continued)

OTHER PUBLICATIONS

PCT International Application No. PCT/KR2021/006008, International Search Report dated Aug. 31, 2021, 5 pages.
(Continued)

*Primary Examiner* — Nghi H Ly
(74) *Attorney, Agent, or Firm* — LEE, HONG, DEGERMAN, KANG & WAIMEY

(57) ABSTRACT

The present disclosure may provide a method of operating a terminal based on a plurality of networks in a wireless communication system. Herein, the method of operating the terminal may include establishing a connection with a public land mobile network (PLMN), determining whether or not to simultaneously access the PLMN and non-public networks (NPN), transmitting, to the NPN, indication information indicating a simultaneous access request for the PLMN and the NPN, receiving, from the NPN, supported PLMN list information, and when the connected PLMN is included
(Continued)

in the supported PLMN list information, accessing the NPN through a packet data unit (PDU) session of the PLMN. Herein, a supported PLMN list may be a list which is determined according to whether or not a quality of service (QoS) is supported based on a service level agreement (SLA) between the PLMN and the NPN.

15 Claims, 17 Drawing Sheets

(51) Int. Cl.
    *H04W 28/24*     (2009.01)
    *H04W 60/04*     (2009.01)
    *H04W 84/04*     (2009.01)

(58) Field of Classification Search
    USPC ............... 455/432.1, 435.1, 422.1, 418, 434
    See application file for complete search history.

(56) References Cited

U.S. PATENT DOCUMENTS

2020/0267785 A1\*   8/2020   Talebi Fard ............ H04L 45/04
2022/0124542 A1\*   4/2022   Li ....................... H04W 88/085

FOREIGN PATENT DOCUMENTS

WO     2020-081773     4/2020
WO     2020-087546     5/2020

OTHER PUBLICATIONS

Samsung, "Access type to PLMN for SNPN access," S2-2002808, SA WG2 Meeting #S2-138E, E-meeting, Apr. 2020, 5 pages.

\* cited by examiner

METHOD AND APPARATUS FOR TRANSMITTING AND RECEIVING SIGNALS IN WIRELESS COMMUNICATION SYSTEM

CROSS-REFERENCE TO RELATED APPLICATION(S)

This application is the National Stage filing under 35 U.S.C. 371 of International Application No. PCT/KR2021/006008, filed on May 13, 2021, which claims the benefit of earlier filing date and right of priority to Korean Application Nos. 10-2020-0058549, filed on May 15, 2020, 10-2020-0106403, filed on Aug. 24, 2020, and 10-2020-0127331, filed on Sep. 29, 2020, the contents of which are all hereby incorporated by reference herein in their entireties.

TECHNICAL FIELD

The present disclosure relates to a wireless communication system, that is, to a method for transmitting and receiving a signal. Particularly, the present disclosure relates to a method for a terminal to receive a service by simultaneously accessing a plurality of networks.

BACKGROUND

Radio access systems have come into widespread in order to provide various types of communication services such as voice or data. In general, a radio access system is a multiple access system capable of supporting communication with multiple users by sharing available system resources (bandwidth, transmit power, etc.). Examples of the multiple access system include a code division multiple access (CDMA) system, a frequency division multiple access (FDMA) system, a time division multiple access (TDMA) system, a single carrier-frequency division multiple access (SC-FDMA) system, etc.

In particular, as many communication apparatuses require a large communication capacity, an enhanced mobile broadband (eMBB) communication technology has been proposed compared to radio access technology (RAT). In addition, not only massive machine type communications (MTC) for providing various services anytime anywhere by connecting a plurality of apparatuses and things but also communication systems considering services/user equipments (UEs) sensitive to reliability and latency have been proposed. To this end, various technical configurations have been proposed.

SUMMARY

The present disclosure may provide a method and apparatus for transmitting and receiving a signal in a wireless communication system.

The present disclosure may provide a method for a terminal to receive a service by simultaneously accessing a plurality of networks.

The present disclosure may provide a method and apparatus for performing simultaneous access based on a public land mobile network (PLMN) list supported by non-public networks (NPN), when a terminal accesses NPN through a PLMN in a wireless communication system.

The present disclosure may provide a method and apparatus for a terminal to control the mobility of a terminal by considering the coverage of an NPN in a wireless communication system.

The technical objects to be achieved in the present disclosure are not limited to the above-mentioned technical objects, and other technical objects that are not mentioned may be considered by those skilled in the art through the embodiments described below.

The present disclosure a method for operating a terminal based on a plurality of networks in a wireless communication system, the method comprising: establishing a connection with a public land mobile network (PLMN); determining whether or not to simultaneously access the PLMN and non-public networks (NPN); transmitting, to the NPN, indication information indicating a simultaneous access request for the PLMN and the NPN; receiving, from the NPN, supported PLMN list information; and based on the connected PLMN being included in the supported PLMN list information, accessing the NPN through a packet data unit (PDU) session of the PLMN, wherein a supported PLMN list is a list which is determined according to whether or not a quality of service (QoS) is supported based on a service level agreement (SLA) between the PLMN and the NPN.

The present disclosure a terminal operating in a wireless communication system, the terminal comprising: at least one transceiver; at least one processor; and at least one memory which is coupled with the at least one processor in an operable manner and is configured to store instructions that make, when being executed, the at least one processor perform a specific operation, wherein the specific operation is configured to: establish a connection with a PLMN, determine whether or not to simultaneously access the PLMN and an NPN, control the at least one transceiver to transmit, to the NPN, indication information indicating a simultaneous access request for the PLMN and the NPN, control the at least one transceiver to receive, from the NPN, supported PLMN list information, and based on the connected PLMN being included in the supported PLMN list information, access the NPN through a PDU session of the PLMN, and wherein a supported PLMN list is a list that is determined according to whether or not a QoS is supported based on an SLA between the PLMN and the NPN.

The present disclosure a method for operating a network in a wireless communication system, the method comprising: establishing, by a PLMN, a connection with a terminal; and based on the PLMN connected with the terminal being included in supported PLMN list information based on an NPN, allowing the terminal to access the NPN through an N3IWF of the NPN based on a PDU session of the PLMN, wherein a supported PLMN list is a list that is determined according to whether or not a QoS is supported based on an SLA between the PLMN and the NPN.

The present disclosure a network operating in a wireless communication system, the network comprising: at least one transceiver; at least one processor; and at least one memory which is coupled with the at least one processor in an operable manner and is configured to store instructions that make, when being executed, the at least one processor perform a specific operation, wherein the specific operation is configured to: allow a PLMN to establish a connection with a terminal, and based on the PLMN connected with the terminal being included in supported PLMN list information based on an NPN, and allow the terminal to access the NPN through an N3IWF of the NPN based on a PDU session of the PLMN, and wherein a supported PLMN list is a list that is determined according to whether or not a QoS is supported based on an SLA between the PLMN and the NPN.

The present disclosure a method for operating a network in a wireless communication system, the method comprising: receiving, from a terminal which has established a connection with a PLMN, indication information indicating a simultaneous access request for the PLMN and an NPN; transmitting, to the terminal, PLMN list information supported in the NPN; and based on the connected PLMN being included in the supported PLMN list information, connecting to the terminal through a PDU session of the PLMN, wherein a supported PLMN list is a list that is determined according to whether or not a QoS is supported based on an SLA between the PLMN and the NPN.

The present disclosure a network operating in a wireless communication system, the network comprising: at least one transceiver; at least one processor; and at least one memory which is coupled with the at least one processor in an operable manner and is configured to store instructions that make, when being executed, the at least one processor perform a specific operation, wherein the specific operation is configured to: control the at least one transceiver to receive, from a terminal which has established a connection with a PLMN, indication information indicating a simultaneous access request for the PLMN and an NPN, control the at least one transceiver to transmit, to the terminal, PLMN list information supported in the NPN, and based on the connected PLMN being included in the supported PLMN list information, connect to the terminal through a PDU session of the PLMN, and wherein a supported PLMN list is a list that is determined according to whether or not a QoS is supported based on an SLA between the PLMN and the NPN.

The present disclosure a device comprising at least memory and at least one processor coupled functionally with the at least one memory, wherein the at least one processor is configured to: control the device to establish a connection with a PLMN, determine whether or not to simultaneously access the PLMN and an NPN, control at least one transceiver to transmit, to the NPN, indication information indicating a simultaneous access request for the PLMN and the NPN, control the at least one transceiver to receive, from the NPN, supported PLMN list information, and based on the connected PLMN being included in the supported PLMN list information, access the NPN through a PDU session of the PLMN, and wherein a supported PLMN list is a list that is determined according to whether or not a QoS is supported based on an SLA between the PLMN and the NPN.

The present disclosure a non-transitory computer-readable medium storing at least one instruction, comprising the at least one instruction executable by at least one processor, wherein the at least one instruction is configured to: control the at least one processor to establish a connection with a PLMN, determine whether or not to simultaneously access the PLMN and an NPN, control at least one transceiver to transmit, to the NPN, indication information indicating a simultaneous access request for the PLMN and the NPN, control the at least one transceiver to receive, from the NPN, supported PLMN list information, and based on the connected PLMN being included in the supported PLMN list information, access the NPN through a PDU session of the PLMN, and wherein a supported PLMN list is a list that is determined according to whether or not a QoS is supported based on an SLA between the PLMN and the NPN.

In addition, the following may be commonly applied.

The present disclosure based on the connected PLMN not being included in the supported PLMN list information, the terminal performs a handover from the PLMN to the NPN and accesses the PLMN through a PDU session of the NPN.

The present disclosure based on the PLMN not including N3IWF (Non-3GPP InterWorking Function) or the handover not being allowed based on a policy of the PLMN, the terminal selects and accesses only any one of the PLMN and the NPN.

The present disclosure the terminal selects any one of the PLMN and the NPN based on a priority order.

The present disclosure the terminal receives the supported PLMN list information from the NPN, irrespective of whether or not the indication information indicating the simultaneous access request for the PLMN and the NPN is transmitted to the NPN.

The present disclosure the supported PLMN list information is pre-configured in the terminal based on the NPN.

The present disclosure based on the terminal accessing the NPN based on the PDU session of the PLMN, the terminal transmits, to the NPN, a registration request message including at least any one of a generic public subscription identifier (GPSI) and an HPLMN ID, and wherein, based on receiving a registration acceptance message from the NPN, the terminal accesses the NPN through the PDU session of the PLMN.

The present disclosure the NPN allows access of the terminal based on coverage of the NPN, and wherein the NPN subscribes to a mobility event of the terminal to the PLMN based on any one of the GPSI and the HPLMN ID of the terminal.

The present disclosure the NPN maps an area of interest (AOI) to target location information and requests mobility event subscription of the terminal to the PLMN based on the AOI.

The present disclosure based on the terminal being out of a target location area based on the AOI, the PLMN provides mobility event information of the terminal to the NPN.

The present disclosure based on the terminal being in a roaming situation, the terminal accesses the NPN through the PDU session of the PLMN based on whether or not an HPLMN of the terminal is included in the supported PLMN list information.

The present disclosure based on the terminal being in a roaming situation, the terminal accesses the NPN through the PDU session of the PLMN based on whether or not an HPLMN of the terminal and a serving PLMN, in which the terminal is roaming, are included in the supported PLMN list information.

The present disclosure the terminal is a terminal that supports a single radio.

Effects obtainable in the embodiments of the present disclosure are not limited to the above-mentioned effects, and other effects not mentioned are the technical fields to which the technical configuration of the present disclosure is applied from the description of the embodiments of the present disclosure below. It can be clearly derived and understood by those of ordinary skill in the art. That is, unintended effects of implementing the configuration described in the present disclosure may also be derived by those of ordinary skill in the art from the embodiments of the present disclosure.

The present disclosure may provide a method for transmitting and receiving a signal in a wireless communication system.

The present disclosure may provide a method for a terminal to receive a service by simultaneously accessing a plurality of networks.

The present disclosure may provide a method and apparatus for performing simultaneous access based on a PLMN list supported by NPN, when a terminal accesses NPN through a PLMN in a wireless communication system.

The present disclosure may provide a method and apparatus for a terminal to control the mobility of a terminal by considering the coverage of an NPN in a wireless communication system.

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure. That is, effects, which are not intended when implementing a configuration described in the present disclosure, may also be derived by those skilled in the art from the embodiments of the present disclosure.

BRIEF DESCRIPTION OF THE DRAWINGS

The accompanying drawings are provided to aid understanding of the present disclosure, and embodiments of the present disclosure may be provided together with a detailed description. However, the technical features of the present disclosure are not limited to a specific drawing, and features disclosed in each drawing may be combined with each other to constitute a new embodiment. Reference numerals in each drawing may mean structural elements.

DETAILED DESCRIPTION

Figure 1:
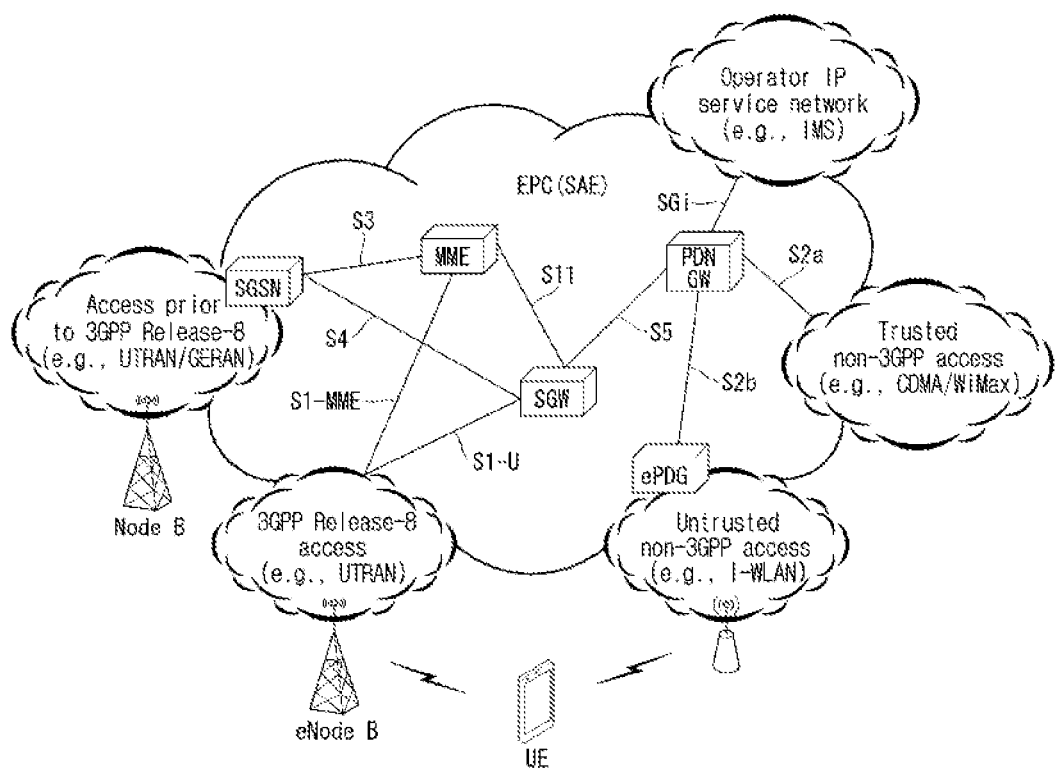
FIG. 1 is a view illustrating various reference points.

Following embodiments are achieved by combination of structural elements and features of the present disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment.

In the description of the drawings, procedures or steps which render the scope of the present disclosure unnecessarily ambiguous will be omitted and procedures or steps which can be understood by those skilled in the art will be omitted.

In the entire specification, when a certain portion "comprises" or "includes" a certain component, this indicates that the other components are not excluded, but may be further included unless specially described. The terms "unit", "-or/er" and "module" described in the specification indicate a unit for processing at least one function or operation, which may be implemented by hardware, software and a combination thereof. In addition, "a or an", "one", "the" and similar related words may be used as the sense of including both a singular representation and a plural representation unless it is indicated in the context describing the present specification (especially in the context of the following claims) to be different from this specification or is clearly contradicted by the context.

In this specification, the embodiments of the present disclosure are described with focus on the relationship of data reception and transmission between a base station and a mobile station. Herein, the base station means a terminal node of a network that performs direct communication with the mobile station. In this document, a specific operation, which is described to be performed by a base station, may be performed by an upper node of the base station in some cases.

That is, in a network consisting of a plurality of network nodes including a base station, various operations for communicating with a mobile station may be performed by the base station or network nodes other than the base station. Herein, "base station" may be replaced by such terms as "fixed station", "Node B", "eNode B(eNB)", "gNode B(gNB)", "ng-eNB", "advanced base station(ABS)", or "access point".

Also, in the embodiments of the present disclosure, "terminal" may be replaced by such terms as "user equipment (UE)", "mobile station(MS)", "subscriber station(SS)", "mobile subscriber station(MSS)", "mobile terminal" or "advanced mobile station(AMS)".

In addition, a transmission end refers to a fixed and/or mobile node that provides a data service or a voice service, and a reception end means a fixed and/or mobile node that receives a data service or a voice service. Accordingly, in the case of an uplink, a mobile station may be a transmission end, and a base station may be a reception end. Likewise, in the case of a downlink, a mobile station may be a reception end, and a base station may be a transmission end.

The embodiments of the present disclosure may be supported by standard documents disclosed in at least one of the following radio access systems: an IEEE 802 xx system, a 3rd generation partnership project (3GPP) system, a 3GPP long term evolution (LTE) system, a 3GPP 5th generation (5G) new radio (NR) system and a 3GPP2 system, and in particular, the embodiments of the present disclosure may be supported by the following documents: 3GPP TS (technical specification) 38.211, 3GPP TS 38.212, 3GPP TS 38.213, 3GPP TS 38.321, and 3GPP TS 38.331.

In addition, the embodiments of the present disclosure are applicable to another radio access system but is not limited to the above-described system. As an example, they are applicable to a system applied after a 3GPP 5G NR system and are not limited to a specific system.

That is, obvious steps and parts not described in the embodiments of the present disclosure may be described with reference to the above documents. In addition, all the terms disclosed in this document may be explained by the standard document.

Hereinafter, a preferred embodiment according to the present disclosure will be described in detail with reference to accompanying drawings. Detailed descriptions disclosed below together with accompanying drawings are intended to describe example embodiments of the present disclosure and not intended to show any sole embodiment in which a technical configuration of the present disclosure can be implemented.

In addition, specific terms used in the embodiments of the present disclosure are provided to help understand the present disclosure, and such specific terms may be used in any other modified forms without departing from the technical idea of the present disclosure.

The following technology may be applied to various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA) and the like.

For clarity of explanation, the descriptions below are based on a 3GPP communication system (e.g. LTE, NR and the like), but the technical idea of the present disclosure is not limited thereto. LTE may mean a technology after 3GPP TS 36.xxx Release 8. Specifically, the LTE technology after 3GPP TS 36.xxx Release 10 may be referred to as LTE-A, and the one after 3GPP TS 36.xxx Release 13 may be referred to as LTE-A pro. 3GPP NR may mean a technology after TS 38.xxx Release 15. 3GPP 6G may mean a technology after TS Release 17 and/or Release 18. "xxx" means the specific number of a standard document. LTE/NR/6G may be referred to collectively as 3GPP system.

Contents described in standard documents released earlier than the present disclosure may be referred to for the background art, terms and abbreviations used in the present disclosure. As an example, 36.xxx and 38.xxx standard documents may be referred to.

3GPP LTE/LTE-A will be mainly focused on to clarify the descriptions below, but the technical features of the present disclosure are not limited thereto.

Terms used in the present disclosure are defined as follows.

IP Multimedia Subsystem or IP Multimedia Core Network Subsystem (IMS): an architectural framework for providing standardization for delivering voice or other multimedia services on internet protocol (IP).

Universal Mobile Telecommunication System (UMTS): the 3rd generation mobile communication technology based on global system for mobile communication (GSM) developed by the 3GPP.

Evolved Packet System (EPS): a network system consisting of an evolved packet core (EPC), that is an IP based packet switched core network, and an access network such as LTE and UTRAN. The EPS is a network of an evolved version of a universal mobile telecommunications system (UMTS).

NodeB: a base station of a UMTS network. It is installed outdoor, and its coverage has a scale of a macro cell.

eNodeB: a base station of an EPS network. It is installed outdoor, and its coverage has a scale of a macro cell.

Home NodeB: it is installed indoors as a base station of the UMTS network, and its coverage has a scale of a macro cell.

Home eNodeB: it is installed indoors as a base station of the EPS network, and its coverage has a scale of a macro cell.

User Equipment (UE): the UE can be called a terminal, a mobile equipment (ME), a mobile station (MS), etc. The UE can be a portable device such as a notebook computer, a cellular phone, a personal digital assistant (PDA), a smart phone, and a multimedia device, or a fixed device such as a personal computer (PC) and a vehicle-mounted device. The term of UE may refer to an MTC UE in the description related to MTC.

Machine Type Communication (MTC): communication performed by machines without human intervention. It may be called Machine-to-Machine (M2M) communication.

MTC terminal (MTC UE or MTC device or MRT apparatus): a terminal (e.g., a vending machine, meter, etc.) having a communication function (e.g., communication with an MTC server over PLMN) over a mobile communication network and performing a MTC function.

Radio Access Network (RAN): a unit including a Node B and a radio network controller (RNC) controlling the Node B in the 3GPP network. The RAN exists at a UE end and provides a connection to a core network.

Home Location Register (HLR)/Home Subscriber Server (HSS): a database containing subscriber information within the 3GPP network. The HSS can perform functions such as configuration storage, identity management, user state storage, etc.

Public Land Mobile Network (PLMN): a network configured for the purpose of providing mobile communication services to individuals. The PLMN can be configured for each operator.

Non-Access Stratum (NAS): a functional layer for exchanging signalling and a traffic message between a UE and a core network at the UMTS and EPS protocol stacks. The NAS mainly functions to support mobility of the UE and support a session management procedure for establishing and maintaining an IP connection between the UE and PDN GW.

Service Capability Exposure Function (SCEF): an entity within the 3GPP architecture for service capability exposure that provides a means to safely expose the services and capabilities provided by 3GPP network interfaces.

Mobility Management Entity (MME): A network node in the EPS network which performs mobility management and session management functions.

Packet Data Network Gateway (PDN-GW): A network node in the EPS network which performs UE IP address allocation, packet screening and filtering, and charging data collection functions.

Serving GW (Serving Gateway): A network node in the EPS network which performs functions such as mobility anchor, packet routing, idle mode packet buffering, and triggering paging for the ME of MME.

Policy and Charging Rule Function (PCRF): A node in the EPS network which performs policy decision to dynamically apply differentiated QoS and billing policies for each service flow.

Open Mobile Alliance Device Management (OMA DM): A protocol designed to manage mobile devices, such as mobile phones, PDAs, and portable computers, which performs functions such as device configuration, firmware upgrade, and error report.

Operation Administration and Maintenance (OAM): A network management function group which provides network fault indication, performance information, and data and diagnostic functions.

Packet Data Network (PDN): A network in which a server (e.g., MMS server, WAP server, etc.) supporting a specific service is located.

PDN connection: A connection from the UE to the PDN, i.e., the association (connection) between the UE represented by the IP address and the PDN represented by the APN.

EPS Mobility Management (EMM): a sublayer of the NAS layer, where the EMM may be in an "EMM-Registered" or "EMM-Deregistered" state depending on whether the UE is network attached or detached.

EMM Connection Management (ECM) connection: A signaling connection for the exchange of NAS messages, established between the UE and the MME. An ECM connection is a logical connection consisting of an RRC connection between the UE and an eNB and Si signaling connection between the eNB and the MME. When the ECM connection is established/terminated, the RRC and Si signaling connections are established/terminated as well. To the UE, the established ECM connection means having an RRC connection established with the eNB, and to the MME, it means having an S1 signaling connection established with the eNB. Depending on whether the NAS signaling connection, i.e., the ECM connection is established, the ECM may have an "ECM-Connected" or "ECM-Idle" state.

Access-Stratum (AS): It includes a protocol stack between the UE and the radio (or access) network and is responsible for transmitting data and network control signals.

NAS configuration Management Object (MO): A management object (MO) used to configure the UE with parameters related to NAS functionality.

Packet Data Network (PDN): A network in which a server (e.g., multimedia messaging service (MMS) server, wireless application protocol (WAP) server, etc.) supporting a specific service is located.

PDN connection: a logical connection between the UE and the PDN, represented by one IP address (one IPv4 address and/or one IPv6 prefix).

Access Point Name (APN): a string that refers to or identifies a PDN. In order to access the requested service or network, it goes through a specific P-GW, which means a predefined name (string) in the network so that the P-GW can be found. (e.g., internet.mnc012.mcc345.gprs)

Access Network Discovery and Selection Function (ANDSF): it is a network entity and provides policies that allow the UE to discover and select an available access on a per operator basis.

EPC path (or infrastructure data path): a user plane communication path through EPC.

E-UTRAN Radio Access Bearer (E-RAB): it refers to the concatenation of a S1 bearer and a corresponding data radio bearer. If there is an E-RAB, there is an one-to-one mapping between the E-RAB and the EPS bearer of the NAS.

GPRS Tunneling Protocol (GTP): a group of IP-based communications protocols used to carry general packet radio service (GPRS) within GSM, UMTS and LTE networks. Within the 3GPP architecture, GTP and proxy mobile IPv6-based interfaces are specified on various interface points. GTP can be decomposed into several protocols (e.g., GTP-C, GTP-U and GTP'). GTP-C is used within a GPRS core network for signalling between gateway GPRS support nodes (GGSN) and serving GPRS support nodes (SGSN). GTP-C allows the SGSN to activate a session (e.g., PDN context activation), deactivate the same session, adjust the quality of service parameters, or renew a session for a subscriber, that has just operated from another SGSN, for the user. GTP-U is used to carry user data within the GPRS core network and between the radio access network and the core network.

Hereinafter, the present disclosure is described based on the terms defined as above.

Three major requirement areas of 5G include (1) an enhanced mobile broadband (eMBB) area, (2) a massive machine type communication (mMTC) area, and (3) an ultra-reliable and low latency communications (URLLC) area.

Some use cases may require multiple areas for optimization, and other use case may be focused on only one key performance indicator (KPI). 5G supports these various use cases in a flexible and reliable method.

5G System Architecture to which the Present Disclosure is Applicable

A 5G system is an advanced technology from 4G LTE mobile communication technology and supports a new radio access technology (RAT), extended long term evolution (eLTE) as an extended technology of LTE, non-3GPP access (e.g., wireless local area network (WLAN) access), etc. through the evolution of the existing mobile communication network structure or a clean-state structure.

The 5G system is defined based on a service, and an interaction between network functions (NFs) in an architecture for the 5G system can be represented in two ways as follows.

Reference point representation: indicates an interaction between NF services in NFs described by a point-to-point reference point (e.g., N11) between two NFs (e.g., AMF and SMF).

Service-based representation: network functions (e.g., AMF) within a control plane (CP) allow other authenticated network functions to access its services. The representation also includes a point-to-point reference point, if necessary.

Overview of 3GPP System

FIG. 1 illustrates various reference points.

In an example of a network structure illustrated in FIG. 1, the SGW and the PDN GW are configured as separate gateways, but the two gateways may be implemented according to a single gateway configuration option.

The MME is an element to perform signaling and control functions for supporting access to the network connection of the UE, allocation, tracking, paging, roaming, and handover of network resources, and so on. The MME controls control plane functions related to subscribers and session management. The MME manages a large number of eNBs and performs signaling of the conventional gateway selection for handover to other 2G/3G networks. Further, the MME performs functions such as security procedures, terminal-to-network session handling, idle terminal location management, and so on.

The SGSN handles all packet data such as mobility management and authentication of the user for another 3GPP network (e.g., GPRS network).

The ePDG serves as a security node for an untrusted non-3GPP network (e.g., I-WLAN, Wi-Fi hotspot, etc.)

As described with reference to FIG. 1, the UE with IP capability can access the IP service network (e.g., IMS) provided by a service provider (i.e., operator) via various components within the EPC based on the non-3GPP access as well as the 3GPP access.

For example, reference points such as S1-U and S1-MME can connect two functions present in different functional entities. The 3GPP system defines a conceptual link connecting two functions present in different functional entities of E-UTRAN and EPC, as a reference point. The following Table 1 summarizes reference points illustrated in FIG. 1. In addition to the example of Table 1, various reference points can exist depending on the network structure.

deployed to provide various communication services such as voice (e.g., voice over Internet protocol (VoIP)) through IMS and packet data.

Figure 2:
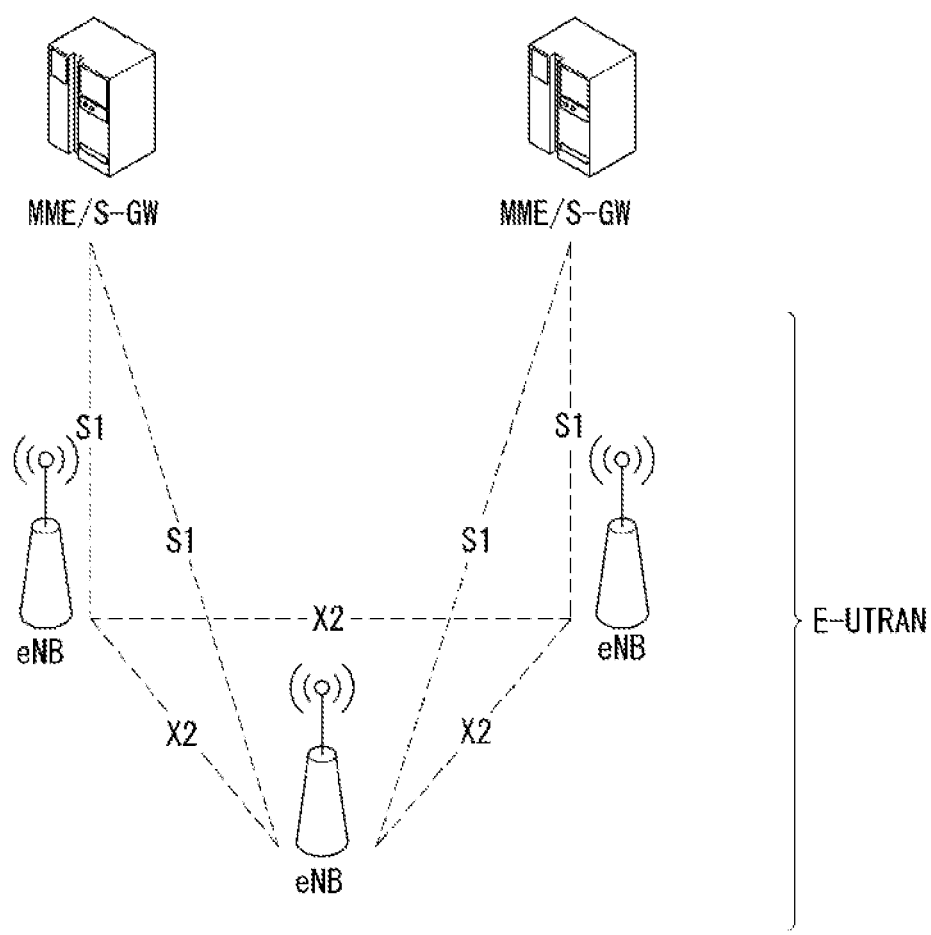
FIG. 2 is a view illustrating an example of a network structure of an evolved universal terrestrial radio access network (E-UTRAN) to which the present disclosure is applicable.

Referring to FIG. 2, an E-UMTS network includes an E-UTRAN, an EPC, and one or more UEs. The E-UTRAN consists of eNBs that provide control plane and user plane protocols to the UE, and the eNBs are interconnected with each other by means of the X2 interface.

X2 user plane (X2-U) interface is defined between the eNBs. The X2-U interface provides non-guaranteed delivery of a user plane packet data unit (PDU). X2 control plane (X2-CP) interface is defined between two neighboring eNBs. The X2-CP performs functions of context delivery between the eNBs, control of user plane tunnel between a source eNB and a target eNB, delivery of handover-related messages, uplink load management, and the like.

The eNB is connected to the UE via a radio interface and is connected to an evolved packet core (EPC) by means of the S1 interface.

S1 user plane (S1-U) interface is defined between the eNB and a serving gateway (S-GW). S1 control plane interface (S1-MME) is defined between the eNB and a mobility management entity (MME). The S1 interface performs functions of evolved packet system (EPS) bearer service management, non-access stratum (NAS) signaling transport, network sharing, MME load balancing, and so on. The Si interface supports many-to-many-relation between the eNB and the MME/S-GW.

The MME can perform various functions such as NAS signaling security, access stratum (AS) security control, inter-core network (CN) node signaling for supporting

TABLE 1

| reference point | description |
|---|---|
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points illustrated in FIG. 1, S2a and S2b correspond to non-3GPP interfaces. S2a is a reference point to provide a user plane with related control and mobility support between the trusted non-3GPP access and the PDN GW. S2b is a reference point to provide a user plane with related control and mobility support between the ePDG and the PDN GW.

FIG. 2 illustrates an example of a network structure of an evolved universal terrestrial radio access network (E-UTRAN) to which the present disclosure is applicable.

An E-UTRAN system is an evolved version of the existing UTRAN system and may be, for example, 3GPP LTE/LTE-A system. Communication networks are widely mobility between 3GPP access networks, idle mode UE reachability (including control and execution of paging retransmission), tracking area identity (TAI) management (for UE in idle and active modes), PDN GW and SGW selection, MME selection for handover with MME change, SGSN selection for handover to 2G or 3G 3GPP access networks, roaming, authentication, bearer management functions including dedicated bearer establishment, support of public warning system (PWS) (including earthquake and tsunami warning system (ETWS) and commercial mobile alert system (CMAS)) message transmission, and the like.

Figure 3:
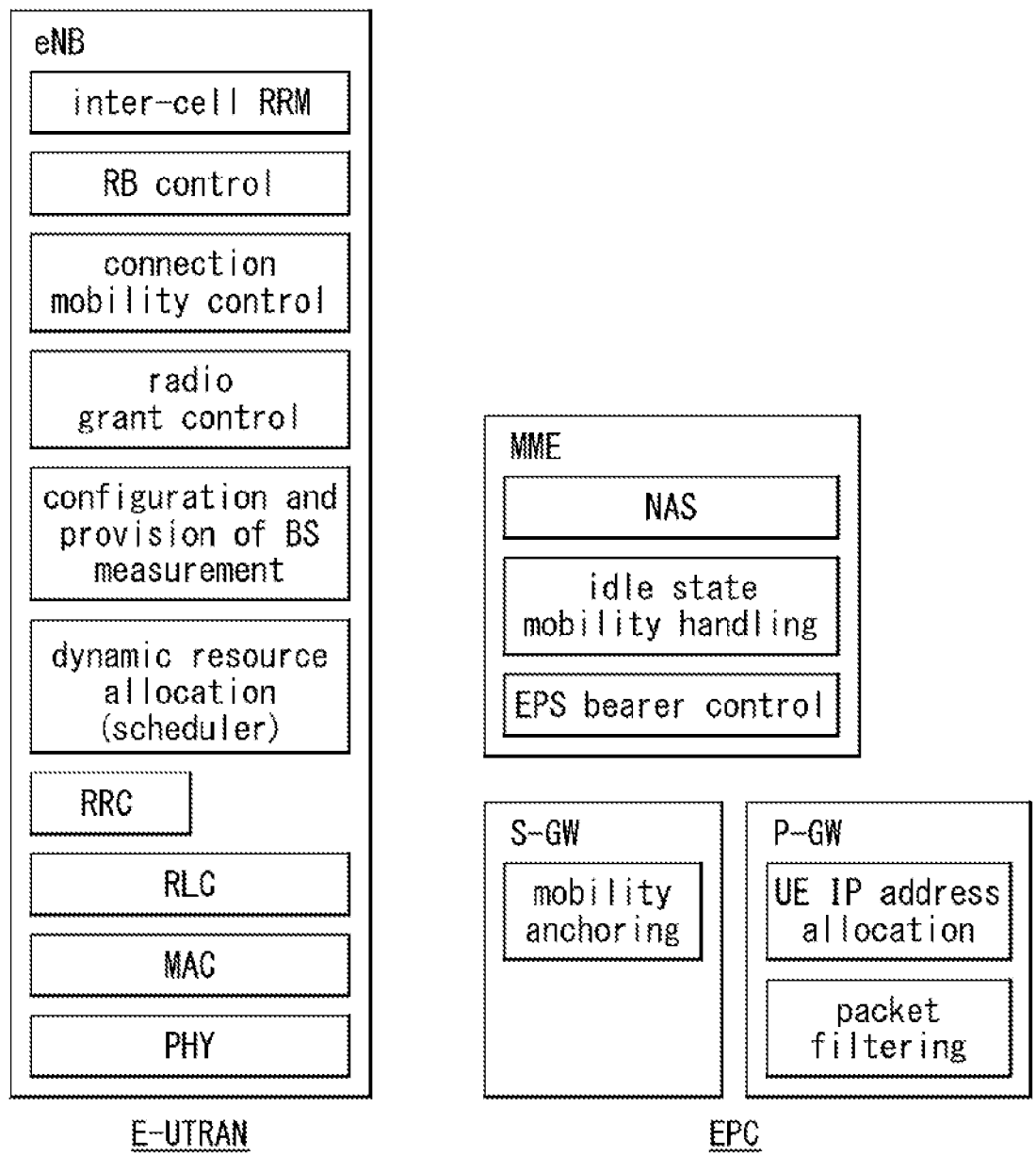
FIG. 3 is a view illustrating a general E-URTAN and an example of an architecture of an evolved packet core (EPC).

FIG. 3 is a view illustrating a general E-URTAN and an example of an architecture of an evolved packet core (EPC).

As illustrated in FIG. 3, the eNB can perform functions such as routing to gateway while radio resource control (RRC) connection is activated, scheduling and transmission of paging messages, scheduling and transmission of a broadcast channel (BCH), dynamic allocation of resources in uplink and downlink to the UE, configuration and provision for the measurement of the eNB, radio bearer control, radio admission control, and connection mobility control. The eNB can perform functions such as paging situation in the EPC, management of an LTE IDLE state, ciphering of a user plane, SAE bearer control, and ciphering and integrity protection of NAS signaling.

Annex J of 3GPP TR 23.799 shows various architectures by combining 5G and 4G. An architecture using NR and NGC is disclosed in 3GPP TS 23.501.

Figure 4:
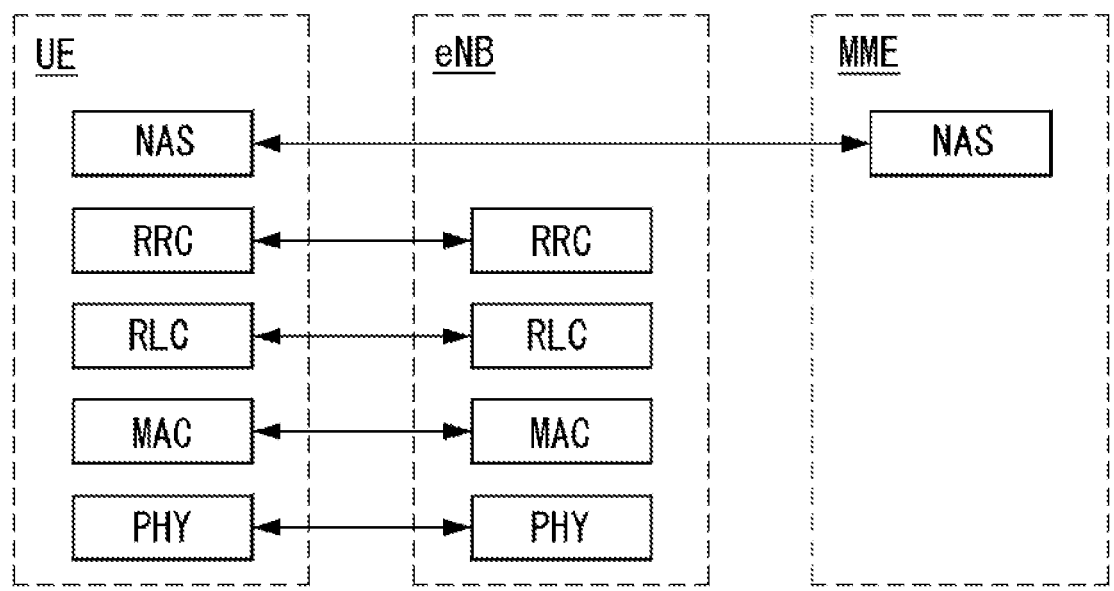
FIG. 4 is a view illustrating an example of a structure of a radio interface protocol in a control plane between user equipment (UE) and evolved node B (eNB).
Figure 5:
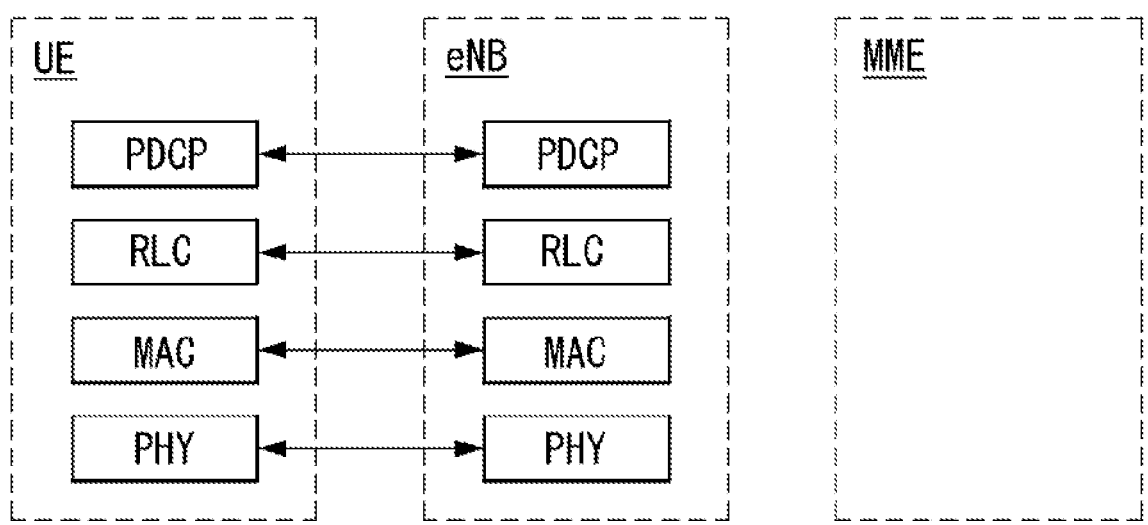
FIG. 5 is a view illustrating an example of a structure of a radio interface protocol in a user plane between UE and eNB.

FIG. 4 is a view illustrating an example of a structure of a radio interface protocol in a control plane between user equipment (UE) and evolved node B (eNB), and FIG. 5 is view illustrating an example of a structure of a radio interface protocol in a user plane between UE and eNB.

The radio interface protocol is based on 3GPP radio access network standard. The radio interface protocol horizontally consists of a physical layer, a data link layer, and a network layer, and is vertically divided into a user plane for data information transmission and a control plane for control signaling delivery.

The protocol layers may be divided into L1 (first layer), L2 (second layer), and L3 (third layer) based upon three lower layers of an open system interconnection (OSI) standard model that is well known in the art of communication systems.

The layers of the radio protocol in the control plane illustrated in FIG. 4 and the layers of the radio protocol in the user plane illustrated in FIG. 5 are described below.

The physical layer, the first layer, provides an information transfer service using a physical channel. The physical layer is connected with a medium access control (MAC) layer located at a higher level via a transport channel, and data between the MAC layer and the physical layer is transferred via the transport channel. Data is transferred between different physical layers, i.e., between physical layers of a transmission side and a reception side via the physical channel.

The physical channel consists of several subframes on a time axis and several subcarriers on a frequency axis. Here, one subframe consists of a plurality of OFDM symbols and a plurality of subcarriers on the time axis. One subframe consists of a plurality of resource blocks, and one resource block consists of a plurality of OFDM symbols and a plurality of subcarriers. A unit time, a transmission time interval (TTI), at which data is transmitted is 1 ms corresponding to one subframe.

Physical channels existing in the physical layers of the transmission side and the reception side may be divided into a physical downlink shared channel (PDSCH) and a physical uplink shared channel (PUSCH) that are data channels, and a physical downlink control channel (PDCCH), a physical control format indicator channel (PCFICH), a physical hybrid-ARQ indicator channel (PHICH), and a physical uplink control channel (PUCCH) that are control channels, according to 3GPP LTE.

There are several layers in the second layer. A medium access control (MAC) layer of the second layer functions to map various logical channels to various transfer channels, and also performs a function of logical channel multiplexing for mapping several logical channels to one transfer channel. The MAC layer is connected to a radio link control (RLC) layer, that is an upper layer, via the logical channel. The logical channel is roughly divided into a control channel used to transmit information of the control plane and a traffic channel used to transmit information of the user plane according to a type of transmitted information.

The MAC layer of the second layer segments and concatenate data received from the upper layer and adjusts a data size so that a lower layer is adapted to transmit data to a radio section.

A packet data convergence protocol (PDCP) layer of the second layer performs a header compression function of reducing an IP packet header size that has a relatively large size and contains unnecessary control information, in order to efficiently transmit data in a radio section having a small bandwidth upon transmission of IP packet such as IPv4 or IPv6. In addition, in the LTE system, the PDCP layer also performs a security function, which consists of ciphering for preventing data interception by a third party and integrity protection for preventing data manipulation by a third party.

A radio resource control (RRC) layer located at the uppermost part of the third layer is defined only in the control plane and is responsible for controlling logical channels, transport channels, and physical channels in relation to configuration, re-configuration, and release of radio bearers (RBs). The RB means services provided by the second layer to ensure data transfer between the UE and the E-UTRAN.

If an RRC connection is established between an RRC layer of the UE and an RRC layer of a wireless network, the UE is in an RRC connected mode. Otherwise, the UE is in an RRC idle mode.

An RRC state of the UE and an RRC connection method are described below. The RRC state refers to a state in which the RRC of the UE is or is not logically connected with the RRC of the E-UTRAN. The RRC state of the UE having logical connection with the RRC of the E-UTRAN is referred to as an RRC_CONNECTED state, and the RRC state of the UE not having logical connection with the RRC of the E-UTRAN is referred to as an RRC_IDLE state. Since the UE in the RRC_CONNECTED state has the RRC connection, the E-UTRAN can identify the presence of the corresponding UE on a per cell basis and thus efficiently control the UE. On the other hand, the E-UTRAN cannot identify the presence of the UE of the RRC_IDLE state, and the UE in the RRC_IDLE state is managed by a core network based on a tracking area (TA) which is an area unit larger than the cell. That is, for the UE in the RRC_IDLE state, only presence or absence of the corresponding UE is identified in an area unit larger than the cell. In order for the UE of the RRC IDLE state to receive typical mobile communication services such as voice and data, the UE should transition to the RRC_CONNECTED state. Each TA is distinguished from another TA by a tracking area identity (TAI) thereof. The UE may configure the TAI through a tracking area code (TAC) which is information broadcasted from a cell.

When the user initially turns on the UE, the UE first searches for a proper cell, and then establishes RRC connection in the corresponding cell and registers information of the UE in the core network. Thereafter, the UE stays in the RRC_IDLE state. The UE staying in the RRC_IDLE state (re)selects a cell and checks system information or paging information, if necessary. This operation is called camping on a cell. Only when the UE staying in the RRC_IDLE state needs to establish the RRC connection, the UE establishes the RRC connection with the RRC layer of the E-UTRAN through a RRC connection procedure and transitions to the RRC_CONNECTED state. There are several cases where the UE remaining in the RRC_IDLE state needs to establish the RRC connection. For example, the cases may include an attempt of a user to make a phone call, an attempt to transmit data, or transmission of a response message when receiving a paging message from the E-UTRAN.

A non-access stratum (NAS) layer positioned over the RRC layer performs functions such as session management and mobility management.

The NAS layer shown in FIG. 4 is described in detail below.

The evolved session management (ESM) belonging to the NAS layer performs functions such as default bearer management and dedicated bearer management to control the UE to use a PS service from a network. The default bearer resources are allocated from a network when they are accessed to the network upon first access to a specific packet data network (PDN). In this instance, the network allocates an IP address available for the UE so that the UE can use a data service, and also allocates QoS of a default bearer. LTE roughly supports two types of bearers including a bearer with guaranteed bit rate (GBR) QoS characteristics for guaranteeing a specific bandwidth for data transmission/reception and a non-GBR bearer with best effort QoS characteristics without guaranteeing a bandwidth. The default bearer is allocated the non-GBR bearer. The dedicated bearer may be allocated a bearer with GBR or non-GBR QoS characteristics.

A bearer that the network allocates to the UE is referred to as an evolved packet service (EPS) bearer. When the network allocates the EPS bearer to the UE, the network assigns one ID. This ID is called an EPS bearer ID. One EPS bearer has QoS characteristics of a maximum bit rate (MBR) and/or a guaranteed bit rate (GBR).

Figure 6:
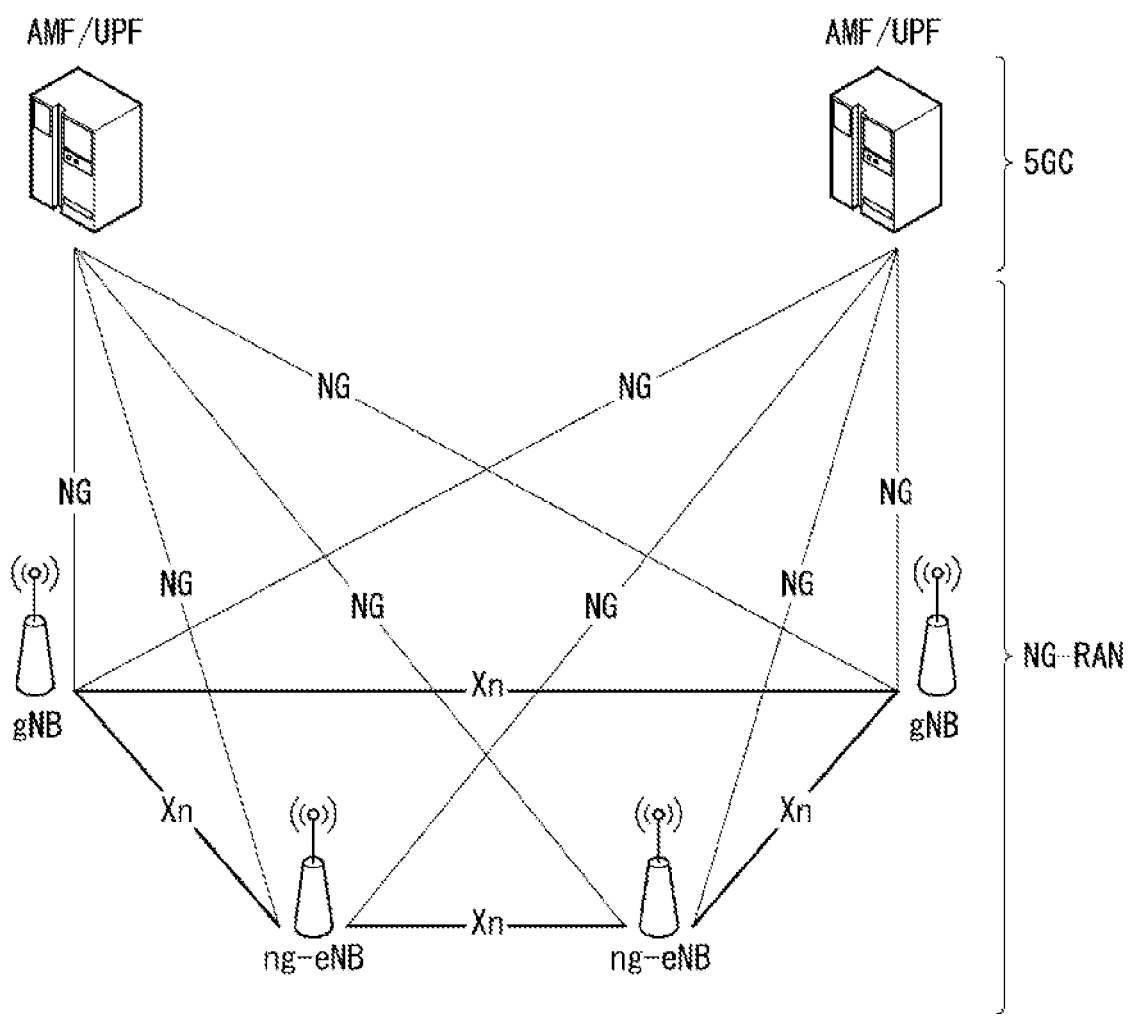
FIG. 6 is a view illustrating an example of an architecture of a general new radio (NR)-radio access network (RAN).

FIG. 6 is a view illustrating an example of an architecture of a general new radio (NR)-radio access network (RAN). Referring to FIG. 6, a NG-RAN node may be one of the following nodes.

gNB providing NR user plane and control plane protocols towards UE, or ng-eNB providing E-UTRA user plane and control plane protocols towards UE gNB and ng-eNB are connected to each other through an Xn interface. In addition, gNB and ng-eNB are connected to an access and mobility management function (AMF) and to a user plane function (UPF) through NG interfaces for 5GC, more particularly, through an NG-C interface and an NG-U interface respectively (refer to 3GPP TS 23.501 [3]).

For reference, an architecture for functional separation and an F1 interface are defined in 3GPP TS 38.401 [4].

Figure 7:
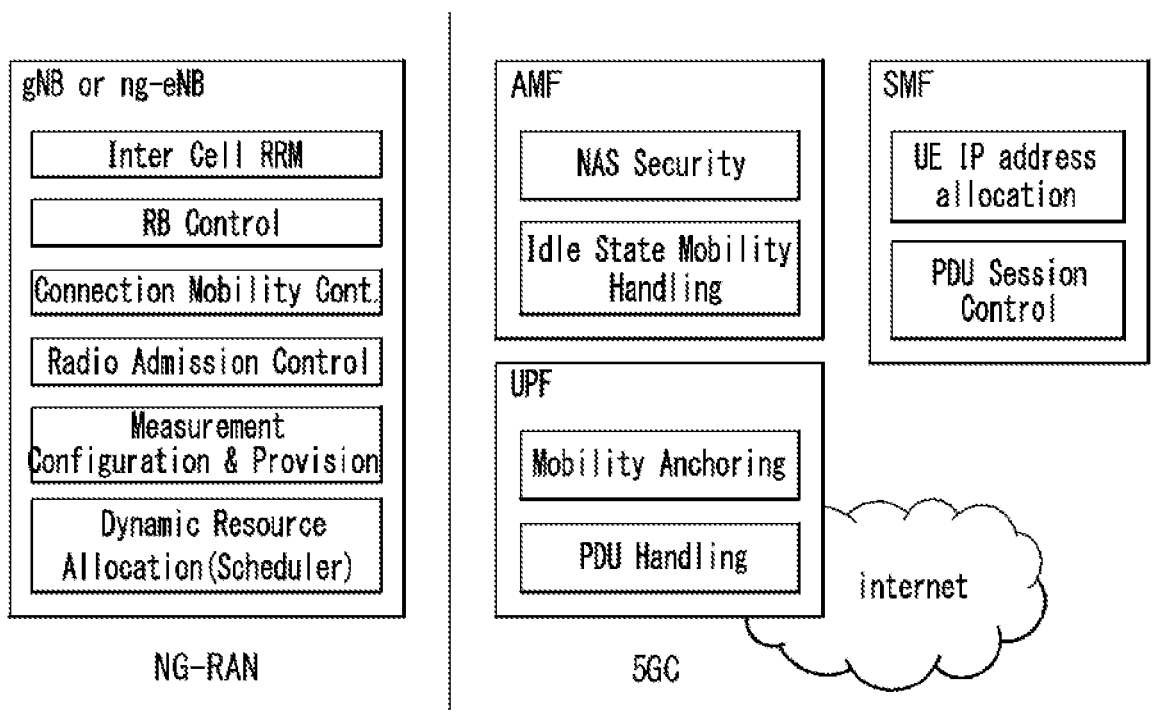
FIG. 7 is a view illustrating an example of functional separation of a general NG-RAN and a 5th generation core (5GC).
Figure 8:
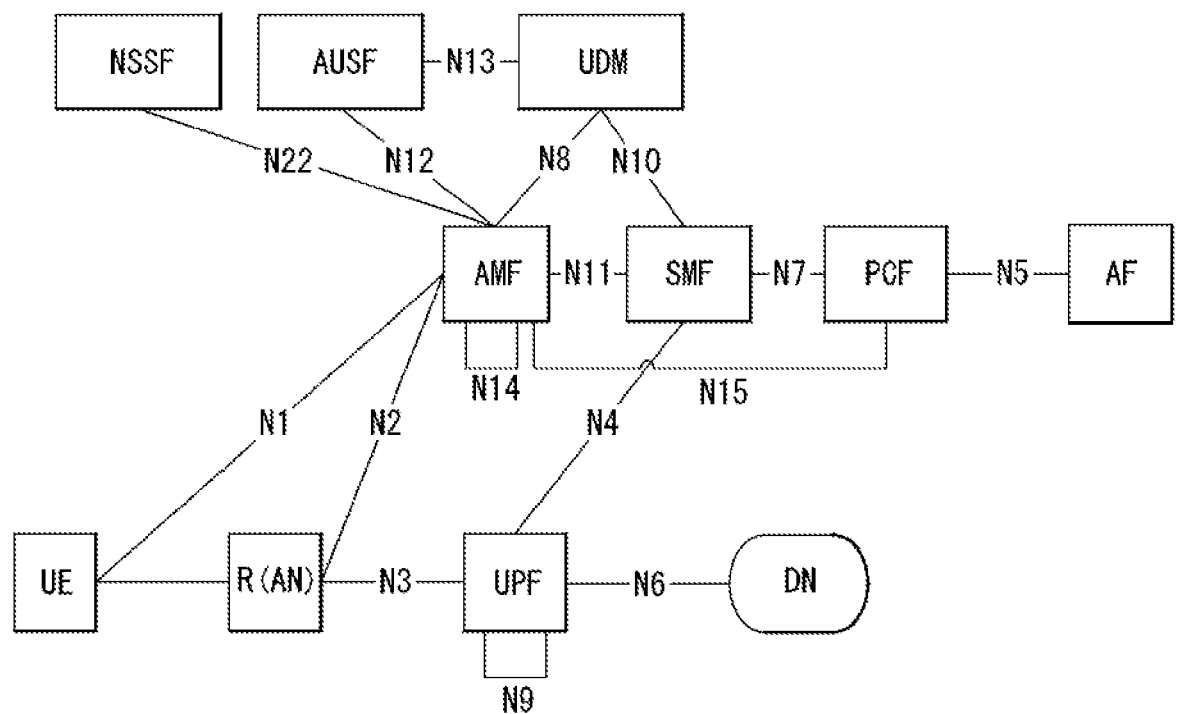
FIG. 8 is a view illustrating an example of a general architecture of a 5th generation (5G) system.

FIG. 7 is a view illustrating an example of functional separation of a general NG-RAN and a 5th generation core (5GC). Referring to FIG. 7, a yellow box represents logical nodes, and a white box represents a main function.

gNB and ng-eNB host the following functions.
Wireless resource management function: wireless bearer control, wireless authentication control, access mobility control, and dynamic resource allocation for UE both in uplink and downlink (scheduling)
IP header compression, encryption and data integrity protection
Selecting AMF in IMT-2000, 3GPP-UE attachment file, in case routing for AMF cannot be determined based on information provided from UE
User plane data routing to UPF
Forwarding control plane information to AMF
Connection configuration and disconnection
Paging message scheduling and transmission
System broadcast information scheduling and transmission (provided in AMF or OAM)
Measurement for mobility and scheduling and configuration of measurement report
Transmission-level packet marking of uplink
Session management
Network slicing support
QoS flow management and mapping for data wireless bearer
Support of UE in RRC_INACTIVE state
NAS message distribution function
Radio access network share
Dual connectivity
Closed interworking between NR and E-UTRA
AMF hosts the following main functions (refer to 3GPP TS 23.501 [3]).
NAS signal termination
NAS signal security
AS security control
Signal transfer between CN nodes for moving between 3GPP access networks
Idle mode UE connectivity (including paging retransmission control and execution)
Registration area management
Mobility support inside system and between systems
Access authentication
Access authorization including confirmation of roaming authority
Mobility management control (subscription and policy)
Network slicing support
SMF selection
UPF hosts the following main functions (refer to 3GPP TS 23.501 [3]).
Anchor point for intra-/inter-RAT mobility (if any)
External PDU session point interconnected with data network
Packet routing and forwarding
Packet check and user plane part of policy rule enforcement
Traffic usage report
Uplink classifier supporting traffic flow to data network
Bifurcation for multi-horned PDU session support
QoS processing for user plane (e.g. packet filtering, gate, UL/DL rate enforcement)
Uplink traffic certification (SDF and QoS flow mapping)
Downlink packet buffering and downlink data notification triggering
Session management function (SMF) hosts the following main functions (refer to 3GPP TS 23.501 [3]).
Session management
UE IP address allocation and management
UP function selection and control
Configuring traffic steering to route traffic to an appropriate destination in UPF
Policy enforcement and partial control of QoS
Downlink data notification FIG. 8 is a view illustrating an example of a general architecture of a 5th generation (5G) system. Hereinafter, each reference interface and each node in FIG. 8 will be described.

Access and mobility management function (AMF) supports such functions as signaling between CN nodes for mobility between 3GPP access networks, termination of a radio access network (RAN) CP interface (N2), termination of NAS signaling (N1), registration management (registration area), idle mode UE reachability, support of network slicing, and SMF selection.

Some or all the functions of AMF may be supported in a single instance of one AMF.

Data network (DN) means an operator service, an Internet access or 3rd party service and the like, for example. DN transmits a downlink protocol data unit (PDU) or receives a PDU from a UPF, which UE transmits.

Policy control function (PCF) receives information on a packet flow from an application server and provides a function of determining policies like mobility management and session management.

Session management function (SMF) provides a session management function, and when UE has a plurality of sessions, each session may be managed by different SMFs.

Some or all the functions of SMF may be supported in a single instance of one SMF.

Unified data management (UDM) stores a user's subscription data, policy data and the like.

User plane function (UPF) forwards a downlink PDU, which is received from a DN, to UE via (R)AN and forwards an uplink PDU, which is received from UE, to a DN via (R)AN.

Application function (AF) operates with a 3GPP core network for service provision (e.g., for supporting functions like application effect on traffic routing, network capability exposure access, mutual operation with policy framework for policy control).

(Radio) access network ((R)AN) collectively refers to new radio access networks that support both evolved E-UTRA, which is an evolved version of 4G radio access, and a new radio (NR) access technology (e.g. eNB).

gNB supports functions for wireless resource management (that is, radio bearer control, radio admission control, connection mobility control, dynamic allocation of resources to UE in uplink/downlink (that is, scheduling)).

User equipment (UE) means a user device.

In a 3GPP system, a conception link connecting NFs in a 5G system is defined as a reference point.

N1 means a reference point between UE and AMF, N2 means a reference point between (R)AN and AMF, N3 means a reference point between (R)AN and UPF, N4 means a reference point between SMF and UPF, N6 means a reference point between UPF and a data network, N9 means a reference point between 2 core UPFs, N5 means a reference point between PCF and AF, N7 means a reference point between SMF and PCF, N24 means a reference point between PCF in a visited network and PCF in a home network, N8 means a reference point between UDM and AMF, N10 means a reference point between UDM and SMF, N11 means a reference point between AMF and SMF, N12 means a reference point between AMF and authentication server function (AUSF), N13 means a reference point between UDM and AUSF, N14 means a reference point between 2 AMFs, N15 means a reference point between PCF and AMF in the case of non-roaming scenario and a reference point between PCF in a visited network and AMF in the case of a roaming scenario, N16 means a reference point between 2 SMFs (in a roaming scenario, a reference point between SMF in a visited network and SMF in a home network), N17 means a reference point between AMF and 5G-equipment identify register (EIR), N18 means a reference point between AMF and unstructured data storage function (UDSF), N22 means a reference point between AMF and network slice selection function (NSSF), N23 means a reference point between PCF and network data analytics function (NWDAF), N24 means a reference point between NSSF and NWDAF, N27 means a reference point between network repository function (NRF) in a visited network and NRF in a home network, N31 means a reference point between NSSF in a visited network and NSSF in a home network, N32 means a reference point between security protection proxy (SEPP) in a visited network and SEPP in a home network, N33 means a reference point between network exposure function and AF, N40 means a reference point between SMF and charging function (CHF), and N50 means a reference point between AMF and circuit bearer control function (CBCF).

Meanwhile, for convenience of explanation, FIG. 8 exemplifies a reference model for a case in which UE has an access to one DN by using one PDU session, but the present disclosure is not limited thereto.

For convenience of explanation, the above description was based on an EPS system using eNB, but it may be replaced by a 5G system by using gNB instead of eNB, AMF instead of mobility management (MM) function of MME, SMF as SM function of S/P-GW, and UPF as user plane-related function of S/P-GW.

In this specification, the above description was based on EPS, but corresponding contents may also be supported in a 5G system through similar operations through a process/message/information with similar objectives.

Communication System Applicable to the Present Disclosure

Although not limited thereto, various descriptions, functions, procedures, proposals, methods and/or operation flowcharts disclosed in the present disclosure are applicable to various fields requiring wireless communication/connection (e.g., 5G) between devices.

Hereinafter, it will be described in greater detail with reference to the drawings. In the following drawings/description, the same reference numerals may denote the same or corresponding hardware blocks, software blocks or functional blocks unless otherwise stated.

Communication System Applicable to the Present Disclosure

Figure 9:
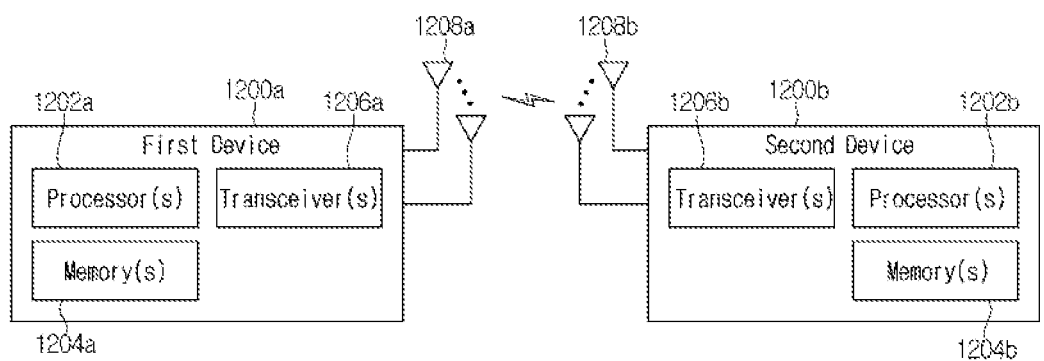
FIG. 9 is a view illustrating an example of a wireless device applicable to the present disclosure.

FIG. 9 is a view showing an example of a wireless device applicable to the present disclosure.

Referring to FIG. 9, a first wireless device 900a and a second wireless device 900b may transmit and receive radio signals through various radio access technologies (e.g., LTE or NR). Here, {the first wireless device 900a, the second wireless device 900b} may correspond to {the wireless device 100x, the base station 120} and/or {the wireless device 100x, the wireless device 100x} of FIG. 1.

The first wireless device 900a may include one or more processors 902a and one or more memories 904a and may further include one or more transceivers 906a and/or one or more antennas 908a. The processor 902a may be configured to control the memory 904a and/or the transceiver 906a and to implement descriptions, functions, procedures, proposals, methods and/or operational flowcharts disclosed herein. For example, the processor 902a may process information in the memory 904a to generate first information/signal and then transmit a radio signal including the first information/signal through the transceiver 906a. In addition, the processor 902a may receive a radio signal including second information/signal through the transceiver 906a and then store information obtained from signal processing of the second information/signal in the memory 904a. The memory 904a may be coupled with the processor 902a, and store a variety of information related to operation of the processor 902a. For example, the memory 904a may store software code including instructions for performing all or some of the processes controlled by the processor 902a or performing the descriptions, functions, procedures, proposals, methods and/or operational flowcharts disclosed herein. Here, the processor 902a and the memory 904a may be part of a communication modem/circuit/chip designed to implement wireless communication technology (e.g., LTE or NR). The transceiver 906a may be coupled with the processor 902a to transmit and/or receive radio signals through one or more antennas 908a. The transceiver 906a may include a transmitter and/or a receiver. The transceiver 906a may be used interchangeably with a radio frequency (RF) unit. In the present disclosure, the wireless device may refer to a communication modem/circuit/chip.

The second wireless device 900b may include one or more processors 902b and one or more memories 904b and may further include one or more transceivers 906b and/or one or more antennas 908b. The processor 902b may be configured to control the memory 904b and/or the transceiver 906b and to implement the descriptions, functions, procedures, proposals, methods and/or operational flowcharts disclosed herein. For example, the processor 902b may process information in the memory 904b to generate third information/signal and then transmit the third information/signal through the transceiver 906b. In addition, the processor 902b may receive a radio signal including fourth information/signal through the transceiver 906b and then store information obtained from signal processing of the fourth information/signal in the memory 904b. The memory 904b may be coupled with the processor 902b to store a variety of information related to operation of the processor 902b. For example, the memory 904b may store software code including instructions for performing all or some of the processes controlled by the processor 902b or performing the descriptions, functions, procedures, proposals, methods and/or operational flowcharts disclosed herein. Herein, the processor 902b and the memory 904b may be part of a communication modem/circuit/chip designed to implement wireless communication technology (e.g., LTE or NR). The transceiver 906b may be coupled with the processor 902b to transmit and/or receive radio signals through one or more antennas 908b. The transceiver 906b may include a transmitter and/or a receiver. The transceiver 906b may be used interchangeably with a radio frequency (RF) unit. In the present disclosure, the wireless device may refer to a communication modem/circuit/chip.

Wireless Device Structure Applicable to the Present Disclosure

Figure 10:
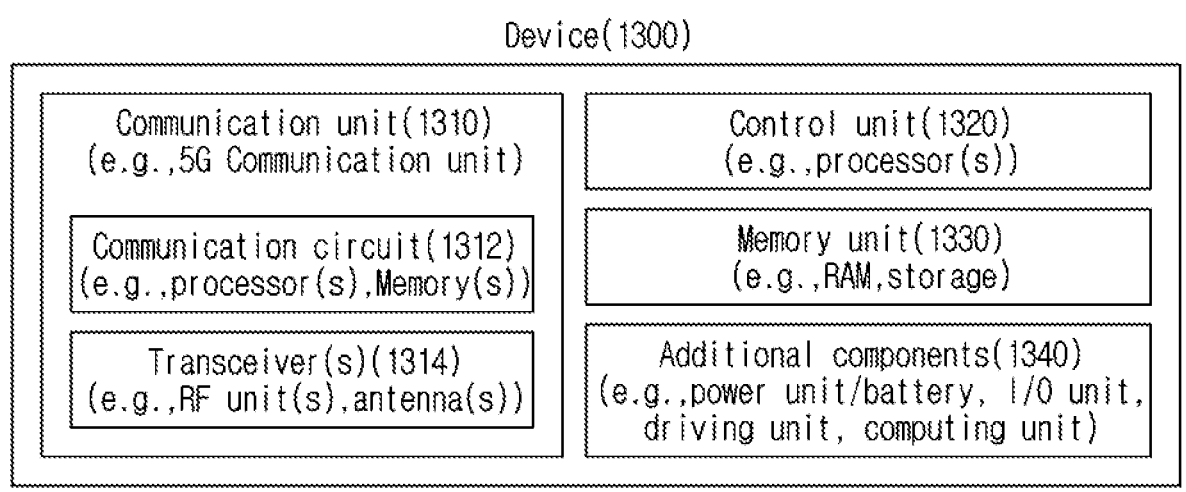
FIG. 10 is a view illustrating another example of a wireless device applied to the present disclosure.

FIG. 10 is a view illustrating another example of a wireless device applicable to the present disclosure.

Referring to FIG. 10, a wireless device 1300 may correspond to the wireless devices 900a and 900b of FIG. 9 and may be configured by various elements, components, units/portions, and/or modules. For example, the wireless device may include a communication unit 1010, a control unit 1020, a memory unit 1030, and an additional element 1040. The communication unit may include a communication circuit 1012 and transceiver(s) 1014. For example, the communication circuit 1012 may include one or more processors 902a and 902b and/or one or more memories 904a and 904b. For example, the transceiver(s) 1014 may include the one or more transceivers 906a and 906b and/or the one or more antennas 908a and 908b of FIG. 9. The control unit 1020 is electrically connected to the communication unit 1010, the memory unit 1030, and the additional element 1040 and controls an overall operation of the wireless device. For example, the control unit 1020 may control an electrical/mechanical operation of the wireless device based on programs/code/commands/information stored in the memory unit 1030. The control unit 1020 may transmit the information stored in the memory unit 1030 to the exterior (e.g., another communication device) via the communication unit 1010 through a wireless/wired interface or may store, in the memory unit 1030, information received through the wireless/wired interface from the exterior (e.g., another communication device) via the communication unit 1010.

The additional element 1040 may be variously configured according to a type of a wireless device. For example, the additional element 1040 may include at least one of a power unit/battery, an input/output (I/O) unit, a driving unit, and a computing unit. The wireless device 1000 may be implemented in the form of, without being limited to, a robot, a vehicle, an XR device, a hand-held device, a home appliance, an IoT device, a digital broadcast terminal, a hologram device, a public safety device, an MTC device, a medical device, a fintech device (or a finance device), a security device, a climate/environment device, an AI server/device, a base station, and a network node. The wireless device may be used in a mobile manner or in a fixed place according to a use-example/service.

In FIG. 10, various elements, components, units/portions, and/or modules in the wireless devices 1000 may be connected, in their entirety, to each other through a wired interface or at least some of them may be wirelessly connected through the communication unit 1010. For example, in the wireless device 1000, the control unit 1020 and the communication unit 1010 may be connected by wires, and the control unit 1020 and other components may be wirelessly connected through the communication unit 1010. Each element, component, unit/portion, and/or module within the wireless device 1000 may further include one or more elements. For example, the control unit 1020 may be configured by a set of one or more processors. As an example, the control unit 1020 may be configured by a set of a communication control processor, an application processor, an electronic control unit (ECU), a graphical processing unit, and a memory control processor. As another example, the memory unit 1030 may be configured by a RAM, a dynamic RAM (DRAM), a ROM, a flash memory, a volatile memory, a non-volatile memory, and/or a combination thereof.

Portable Device to which the Present Disclosure is Applicable

Figure 11:
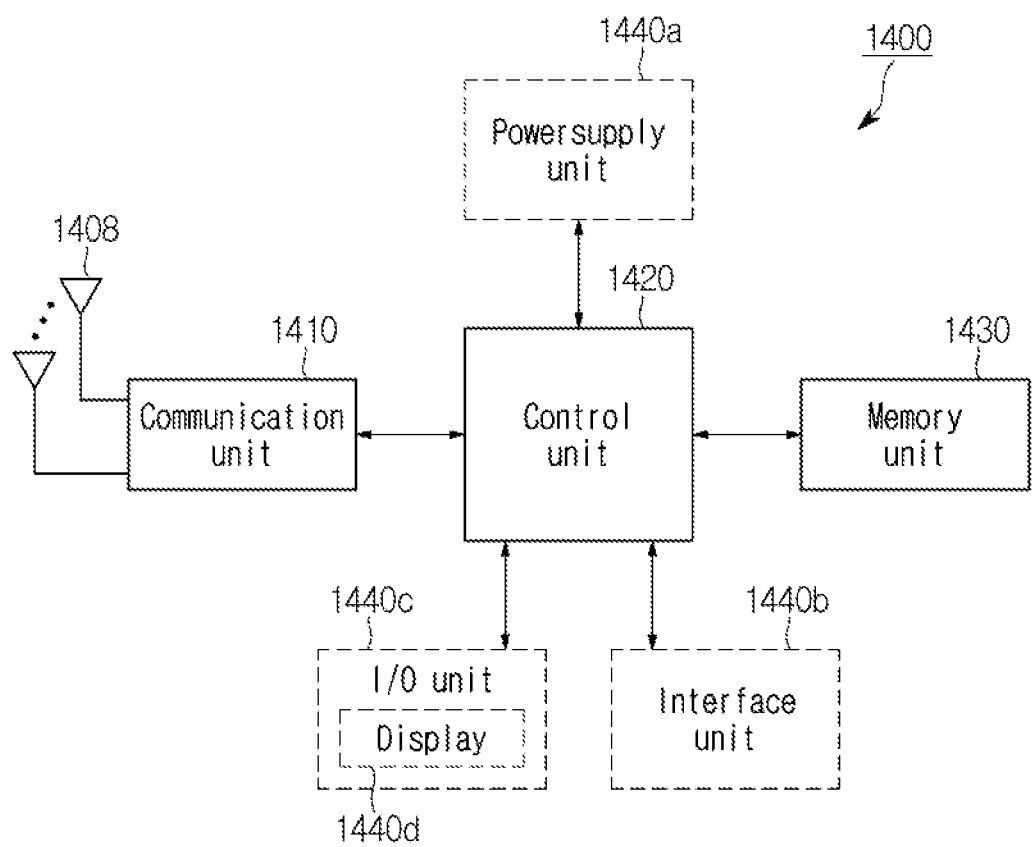
FIG. 11 is a view illustrating an example of a mobile device applied to the present disclosure.

FIG. 11 is a view illustrating an example of a portable device which is applied to the present disclosure.

FIG. 11 exemplifies a portable device which is applied to the present disclosure. A portable device may include a smart phone, a smart pad, a wearable device (e.g., a smart watch or a smart glasses), or a portable computer (e.g., a notebook). A portable device may be referred to as a mobile station (MS), a user terminal (UT), a mobile subscribed station (MSS), a subscribed station (SS), an advanced mobile station (AMS), or a wireless terminal (WT).

Referring to FIG. 11, a portable device 1100 may include an antenna unit 1108, a communication unit 1110, a control unit 1120, a memory unit 1130, a power supply unit 1140a, an interface unit 1140b, and an input/output unit 1140c. The antenna unit 1108 may be configured as a part of the communication unit 1110. Blocks 1110 to 1130/1140a to 1140c correspond to blocks 1010 to 1030/1040 respectively.

The communication unit 1110 may transmit and receive signals (e.g., data and control signals) to and from other wireless devices and base stations. The control unit 1120 may perform various operations by controlling constituent elements of the portable device 1100. The control unit 1120 may include an application processor (AP). The memory unit 1130 may store data/parameters/programs/code/commands necessary to drive the portable device 1100. In addition, the memory unit 1130 may store input/output data/information. The power supply unit 1140*a* may supply power to the portable device 1100 and include a wired/wireless charging circuit, a battery and the like. The interface unit 1140*b* may support a connection between the portable device 1100 and another external device. The interface unit 1140*b* may include various ports (e.g., an audio I/O port and a video I/O port) for connection with external devices. The input/output unit 1140*c* may input or output video information/signal, audio information/signal, data, and/or information input by a user. The input/output unit 1140*c* may include a camera, a microphone, a user input unit, a display unit 1140*d*, a speaker, and/or a haptic module.

As an example, in the case of data communication, the input/output unit 1140*c* may acquire information/signals (e.g., touch, text, voice, image, or video) input by a user and the acquired information/signals may be stored in the memory unit 1130. The communication unit 1110 may convert the information/signals stored in the memory unit into radio signals and transmit the converted radio signals directly to another wireless device or to a base station. The communication unit 1110 may receive a radio signal from another wireless device or a base station and then restore the received radio signal into the original information/signal. The restored information/signal may be stored in the memory unit 1130 and then be output in various forms (e.g., text, voice, image, video, or haptic) through the input/output unit 1140*c*.

Figure 12:
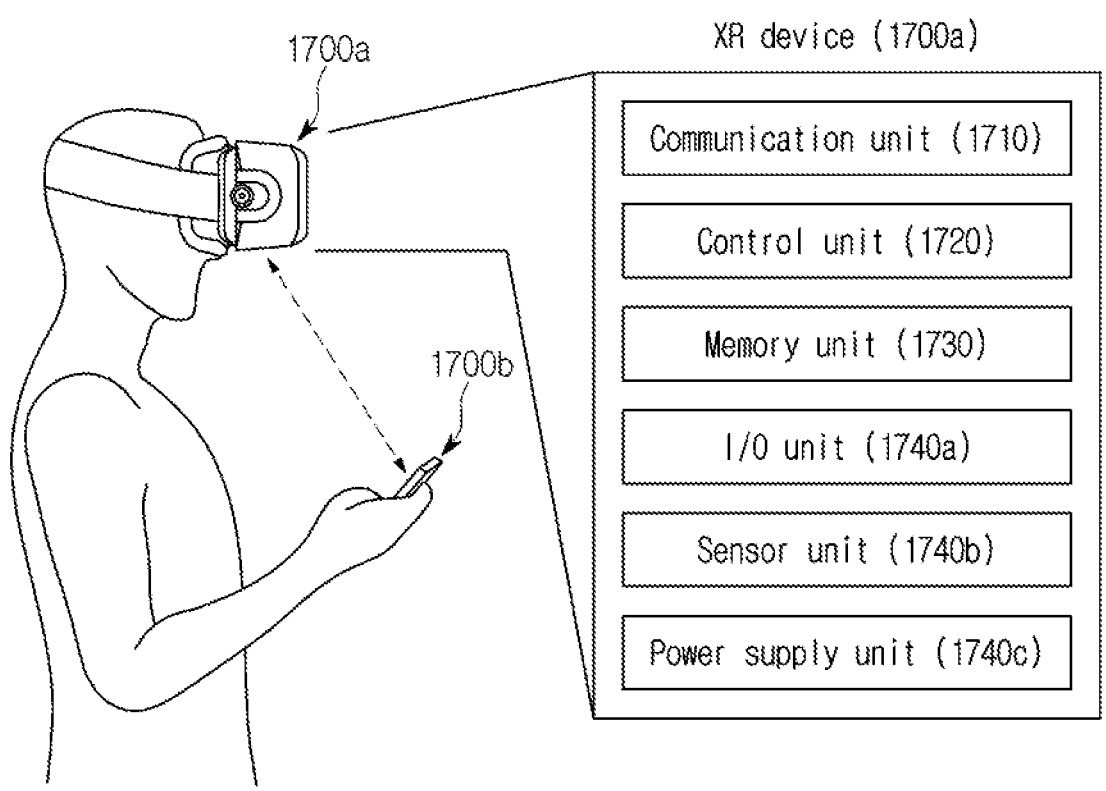
FIG. 12 is a view illustrating an example of an XR device applied to the present disclosure.

FIG. 12 is a view illustrating an example of an XR device applicable to the present disclosure. An XR device may be implemented as a head-mount display (HMD), a head-up display (HUD) provided in a vehicle, a TV, a smart phone, a computer, a wearable device, a home appliance, a digital signage, a vehicle, and a robot.

Referring to FIG. 12, an XR device 1200*a* may include a communication unit 1210, a control unit 1220, a memory unit 1230, an input/output unit 1240*a*, a sensor unit 1240*b*, and a power supply unit 1240*c*. Herein, blocks 1210 to 1230/1240*a* to 1240*c* may correspond to blocks 1310 to 1330/1340 of FIG. 10.

The communication unit 1210 may transmit and receive signals (e.g., media data, control signals) to and from external devices like another wireless device, a portable device, or a media server. Media data may include a video, an image, and a sound. The control unit 1220 may perform various operations by controlling constituent elements of the XR device 1200*a*. For example, the control unit 1220 may be configured to control and/or perform procedures of video/image acquisition, (video/image) encoding, metadata generation and processing and the like. The memory unit 130 may store data/parameters/programs/code/commands needed to drive the XR device 1200*a*/to generate an XR object.

The input/output unit 1240*a* may acquire control information and data from outside and output a generated XR object. The input/output unit 1240*a* may include a camera, a microphone, a user input unit, a display unit, a speaker, and/or a haptic module. The sensor unit 1240*b* may acquire a XR device state, surrounding environment information, user information and the like. The sensor unit 1240*b* may include a proximity sensor, an illuminance sensor, an acceleration sensor, a magnetic sensor, a gyro sensor, an inertial sensor, a red-green-blue (RGB) sensor, an infrared (IR) sensor, a fingerprint recognition sensor, an ultrasonic sensor, an optical sensor, a microphone and/or a radar. The power supply unit 1240*c* may supply power to the XR device 1200*a* and include a wired/wireless charging circuit, a battery and the like.

As an example, the memory unit 1230 of the XR device 1200*a* may include information (e.g., data) necessary to generate an XR object (e.g., AR/VR/MR object). The input/output unit 1240*a* may acquire, from a user, a command for manipulating the XR device 1200*a*, and the control unit 1220 may drive the XR device 1200*a* according to the user's driving command. For example, in case a user wants to watch a film or the news through the XR device 1200*a*, the control unit 1220 may transmit contents request information to another device (e.g., portable device 1200*b*) or a media server through the communication unit 1230. The communication unit 1230 may download/stream contents like films and news from another device (e.g., portable device 1200*b*) or a media server to the memory unit 1230. The control unit 1220 may control and/or perform, for contents, procedures of video/image acquisition, (video/image) encoding, and metadata generation/processing and generate/output an XR object based on information on a surrounding space or a real object, which is acquired through the input/output unit 1240*a*/the sensor unit 1240*b*.

In addition, the XR device 1200*a* may be wirelessly connected to the portable device 1200*b* through the communication unit 1210, and an operation of the XR device 1200*a* may be controlled by the portable device 1200*b*. For example, the portable device 1200*b* may operate as a controller for the XR device 1200*a*. To this end, the XR device 1200*a* may acquire three-dimensional location information of the portable device 1200*b* and then generate and output an XR object corresponding to the portable device 1200*b*.

As an example, a terminal may be connected to a data network via UPF through an NG-RAN, as described above. In addition, a terminal may also receive a data service through an NPN (e.g., unreliable non-3GPP access). More particularly, as shown in FIG. 6 or FIG. 7, a terminal may not only receive a data service by accessing a core network through an NG-RAN based on a PLMN but also receive a service through an NPN.

Herein, as an example, while a terminal receives a service through a PLMN, the terminal may receive a data service at the same time by accessing an NPN network through a session of the PLMN. On the other hand, it is possible to consider a case in which an NG-RAN connected with a terminal is an NPN. Herein, while receiving a data service through the NPN, the terminal may receive a data service by connecting to a PLMN through a session of the NPN. That is, a terminal may access another network through a network which the terminal is accessing.

Herein, as an example, in case a terminal accesses an NPN through a PLMN or accesses the PLMN through the NPN, the quality of service (QoS) for a data service provided to the terminal needs to be ensured. As an example, in consideration of what is described above, a service level agreement (SLA) may be set between an NPN and a PLMN, and the QoS for a service to be provided to a terminal may be supported based on an SLA.

Specifically, a PLMN and an NPN may set an SLA through a pre-configuration and identify a QoS supported through another network based on this. Herein, in case the QoS for a service, which a terminal wants to receive, can be supported based on an SLA between the PLMN and the NPN, the terminal may receive a data service by accessing another network through a session of a network which the terminal has accessed. On the other hand, in case the QoS for a service, which a terminal wants to receive, cannot be supported based on an SLA between the PLMN and the NPN, the terminal may not receive a data service by accessing another network through a session of a network which the terminal has accessed, and this will be described below. That is, a terminal needs to recognize whether or not QoS is supported based on an SLA between a PLMN and an NPN, and the terminal may receive a service of another network through a session of a network that the terminal has accessed.

Herein, like the above-described NPN, a PLMN is an entity for providing an interworking function with a non-3GPP access network and may include a non-3GPP interworking function (N3IWF). As a concrete example, through N3IWF, an AMF in a PLMN may support NAS signaling to a terminal connected to another network. In addition, an AMF may support authentication of a connected terminal through N3IWF and thus manage the mobility and authentication/security context state of a terminal.

In addition, as an example, N31WF may support to set an IPsec tunnel with a terminal connected to another network. N3IWF may set a IKEv2/IPsec protocol with a terminal through NWu and relay, through N2, information necessary to authenticate a terminal and give an access right to a core network. In addition, N3IWF may relay uplink and downlink control plane N1 signaling between a terminal and an AMF. In addition, N3IWF may process an N2 signal of an SMF, which is relayed by an AMF in association with a PDU session and a QoS, and establish an IPsec SA that supports PDU session traffic. Herein, N3IWF may be a N2 and N3 interface end for a core network for a control plane and a user plane respectively. In addition, N3IWF may relay an uplink and downlink user plane packet between a terminal and a UPF. Herein, N3IWF may perform packet decapsulation/encapsulation for IPSec and N3 tunneling. In addition, N3IWF may apply a QoS corresponding to N3 packet marking by considering a QoS requirement associated with a marking received through N2. That is, N3IWF may be an entity for providing an interworking function between a PLMN and an NPN, and thus a terminal may access another network through a session of a network that the terminal has accessed.

Figure 13:
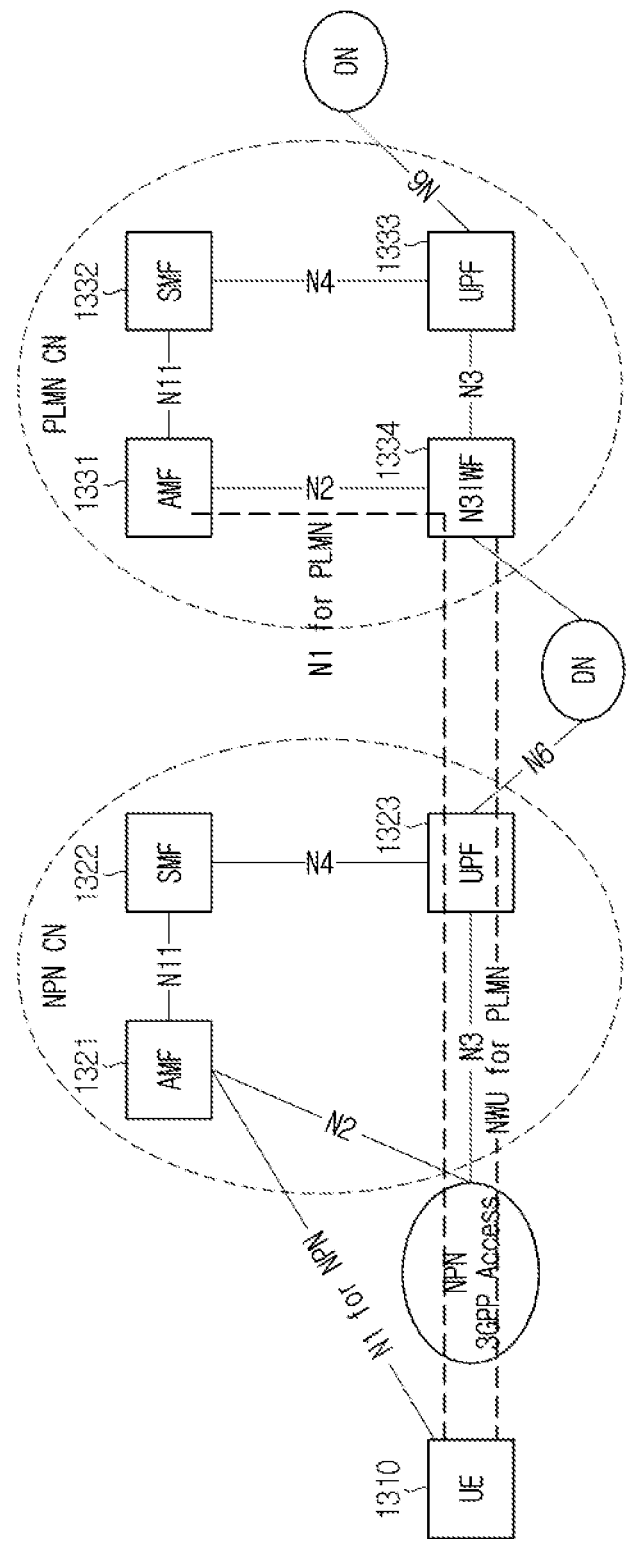
FIG. 13 is a view illustrating a method for a terminal applied to the present disclosure to access a PLMN through an NPN.

As a concrete example, FIG. 13 is a view showing a method for a terminal to access a PLMN service through an NPN in accordance with an embodiment of the present disclosure. Referring to FIG. 13, a terminal 1310 may access an NPN as a 3GPP network. As an example, the terminal 1310 may receive a data service that is provided through an NPN based on an AMF 1321 of the NPN, an SMF 1322 of the NPN, and a UPF 1321 of the NPN. In addition, as an example, the terminal 1310 may access a PLMN through a session of the NPN and receive a data service. Herein, in case the terminal 1310 wants to receive a data service of the PLMN through a session of the NPN, the terminal 1310 may acquire an IP and receive the data service of the PLMN by performing a discovery and establishment procedure for connecting to an N3IWF 1334 of the PLMN that supports to set an IPsec tunnel with the terminal. Herein, as an example, "N1 for NPN" in FIG. 13 may be an interface for connecting the terminal 1310 and the AMF 1321 of the NPN. In addition, "NWu for PLMN" may be an interface in which the terminal 1310 and the N3IWF 1334 of the PLMN establish a security tunnel through an NPN. In addition, "N1 for PLMN" may be an interface for connecting the terminal 1310 and the AMF 1331 of the PLMN. That is, as described above, the terminal 1310 may receive not only a service for an NPN, which the terminal 1310 has accessed, but also a service that is provided through the AMF 1331 of a PLMN, the SMF 1332 of the PLMN and the UPF 1333 of the PLMN via the N3IWF 1334 of the PLMN. Herein, as an example, a QoS supported based on an SLA may be set between the NPN and the PLMN, and a terminal may recognize, based on this, whether or not a QoS required by a data service is ensured.

Figure 14:
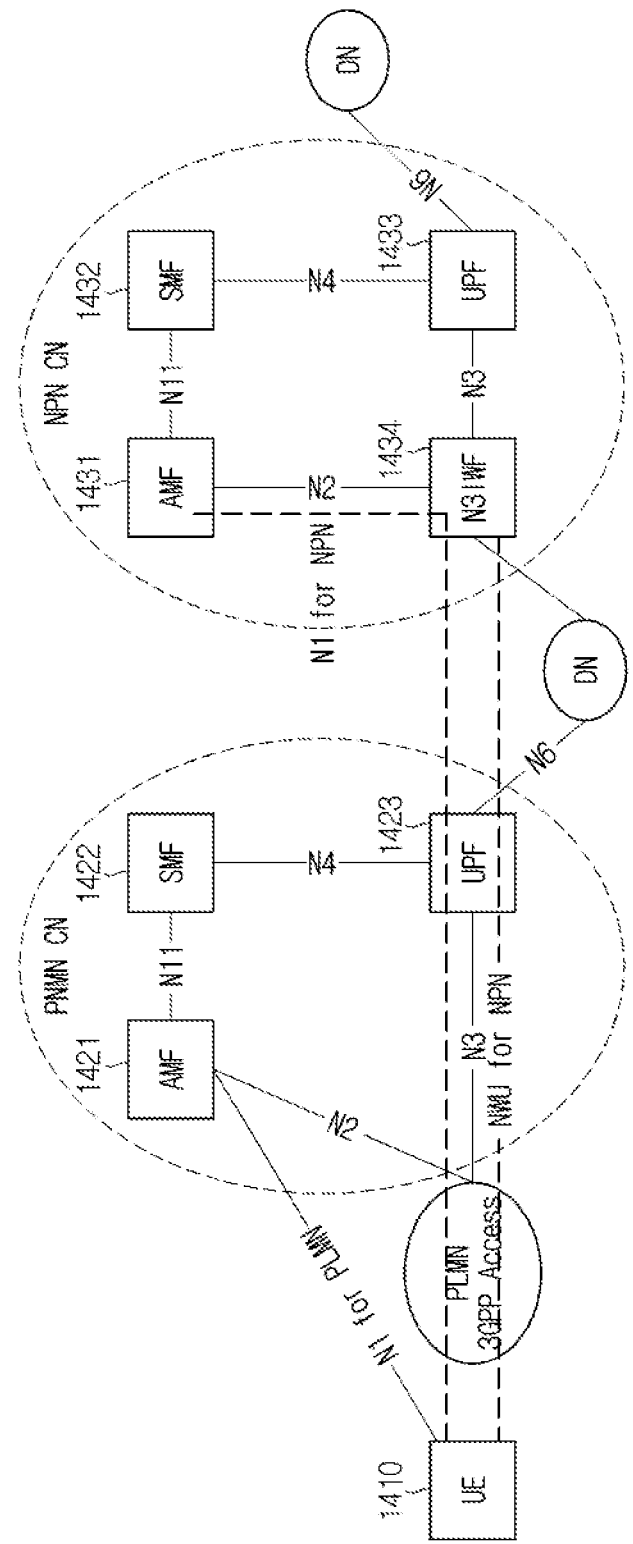
FIG. 14 is a view illustrating a method for a terminal applied to the present disclosure to access an NPN through a PLMN.

In addition, FIG. 14 is a view showing a method for a terminal to access an NPN service through a PLMN in accordance with an embodiment of the present disclosure. Referring to FIG. 14, a terminal 1410 may access a PLMN as a 3GPP network. As an example, the terminal 1410 may receive a data service that is provided through the PLMN based on an AMF 1421 of the PLMN, an SMF 1442 of the PLMN, and a UPF 1421 of the PLMN. In addition, as an example, the terminal 1410 may access an NPN through a session of the PLMN and receive a data service through the NPN. Herein, in case the terminal 1410 wants to receive a data service of the NPN through a session of the PLMN, the terminal 1410 may acquire an IP and receive the data service of the NPN by performing a discovery and establishment procedure for connecting to an N3IWF 1434 of the NPN that supports to set an IPsec tunnel with the terminal. Herein, as an example, "N1 for PLMN" in FIG. 14 may be an interface for connection of the AMF 1421 of the PLMN. In addition, "NWu for NPN" may be an interface in which the terminal 1410 and the N3IWF 1434 of the NPN establish a security tunnel through the PLMN. In addition, "N1 for NPN" may be an interface for connecting the terminal 1410 and the AMF 1431 of the NPN. That is, as described above, the terminal 1410 may receive not only a service for a PLMN, which the terminal 1410 has accessed, but also a service that is provided through the AMF 1431 of an NPN, the SMF 1432 of the PLMN and the UPF 1433 of the PLMN via the N3IWF 1434 of the NPN. Herein, as an example, a QoS supported based on an SLA may be set between the NPN and the PLMN, and a terminal may recognize, based on this, whether or not a QoS required by a data service is ensured.

As described above, a terminal may receive a service of another network through a session of a network which the terminal has accessed. That is, a terminal may receive services simultaneously through two networks. Herein, as an example, in case a terminal can access an NPN and a PLMN simultaneously but no NPN access mode is set, the terminal may select the PLMN and access the NPN through the selected PLMN. In addition, as an example, in case a terminal can access an NPN and a PLMN simultaneously and select a network, the terminal may access either the NPN or the PLMN and connect to another network.

Herein, as an example, it is possible to consider an NPN that supports a VIAPA (video, imaging and audio for professional applications) service. Specifically, FIG. 15 is a view showing a method of supporting a VIAPA service based on an NPN according to an embodiment of the present disclosure.

Figure 15:
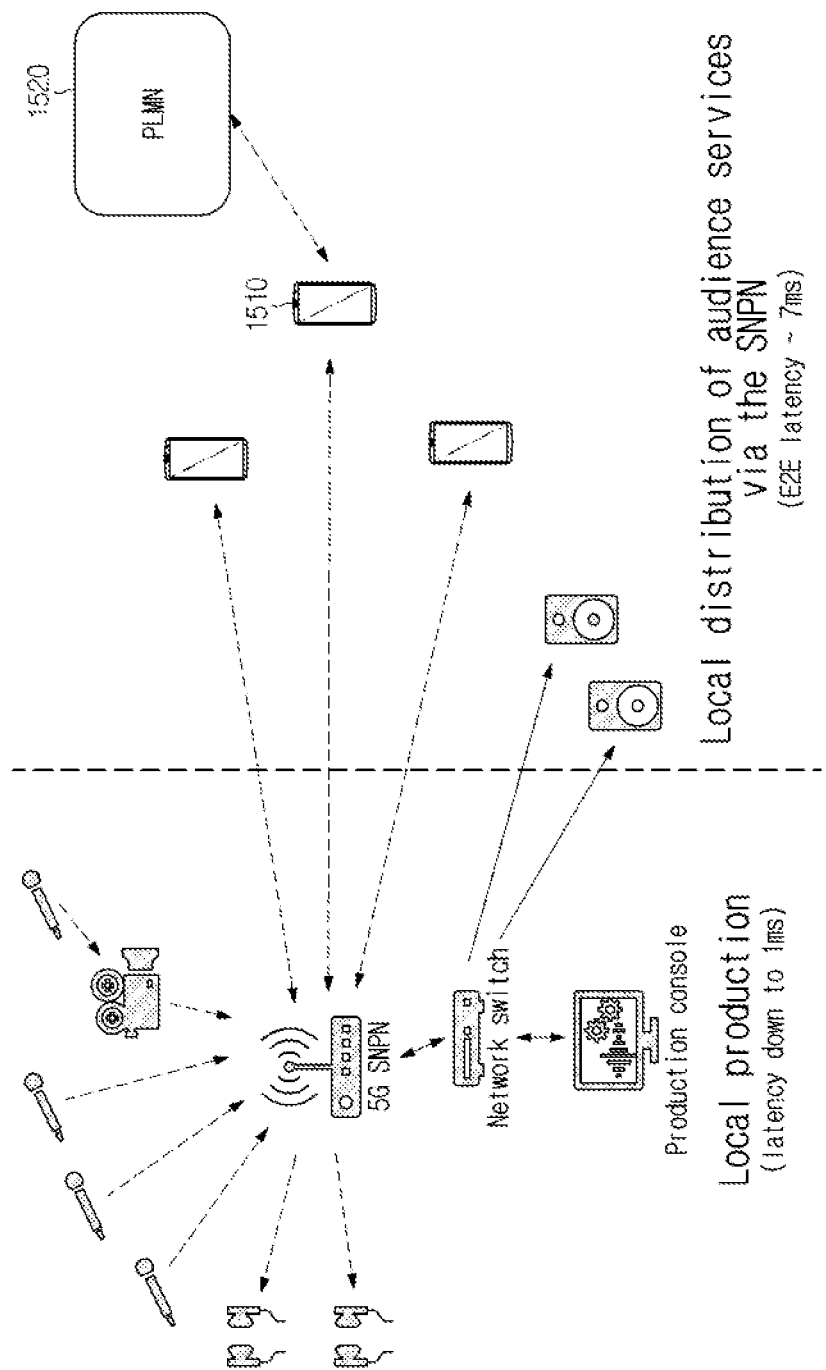
FIG. 15 is a view illustrating a method of providing a VIAPA (Video, Imaging and Audio for Professional Applications) service applied to the present disclosure.

Referring to FIG. 15, a VIAPA service may be a service provided based on audio and video. As an example, it may be a case in which an audio and video service is provided to a terminal 1510 within the coverage of an NPN in a local area. Specifically, a VIAPA service may be provided to terminals in an indoor space based on an NPN in a concert hall or other indoor facilities.

Herein, as an example, the terminal 1510, which receives a VIAPA service through an NPN, may be a terminal that receives data through a PLMN 1520. That is, normal user terminals may be terminals, which receive an existing data service based on the PLMN 1520, and be terminals that access an NPN to receive a VIAPA service through an NPN provided in a specific indoor space. In addition, terminals may be implemented by a single radio and by a plurality of radios. As an example, in case a terminal is implemented by a single radio, the terminal may access a single network. On the other hand, in case a terminal is implemented by a plurality of radios, the terminal may access respective networks through respective radios. As an example, an NPN and a PLMN may operate based on different operators. In addition, an NPN may also be a network, which operates based on NG-RAN and 5CG, and may not be limited to a specific form. In addition, a VIAPA service may be an audio and video service, for which a high QoS needs to be ensured, and a requirement for low latency may be needed for terminals receiving the service.

In the above-described situation, a terminal needs to receive a VIAPA service through an NPN, while receiving another data service through a PLMN. Herein, a terminal needs to satisfy a requirement for a data rate and low latency by considering a QoS for a VIAPA service, and a method for this will be described below. However, this is merely one example for convenience of explanation and is not limited to the above-described embodiment.

Herein, as an example, an NPN may be a stand-alone non-public network (SNPN) that is independently configured based on a specific coverage like a concert hall or other indoor areas in which the above-described VIAPA service is provided. That is, an NPN may be a stand-alone network, which exists independently, but is not limited thereto. As an example, in FIG. 15, the description was based on an SNPN for the purpose of convenience but is not limited thereto and may be applicable to an NPN in the same manner. Hereinafter, for convenience of explanation, the description below is based on an NPN, and it can be apparently applied to other types of NPNs including SNPN.

As an example, based on what is described above, a terminal may receive a service provided in an NPN and a service provided in a PLMN at the same time. Herein, in case a terminal supports a plurality of radios, the terminal may perform registration to an NPN and a PLMN respectively and receive a service simultaneously.

On the other hand, in case a terminal supports only a single radio (e.g., single Tx and single Rx or single Tx and dual Rx), the terminal cannot perform registration to an NPN and a PLMN respectively but needs to receive a service simultaneously. In consideration of what is described above, a method for simultaneously using a VIAPA service and a PLMN service will be described below. As an example, hereinafter, for convenience of explanation, the description will be based on a VIAPA service but may be applied likewise to another NPN-based service and not be limited to a specific form.

Figure 16:
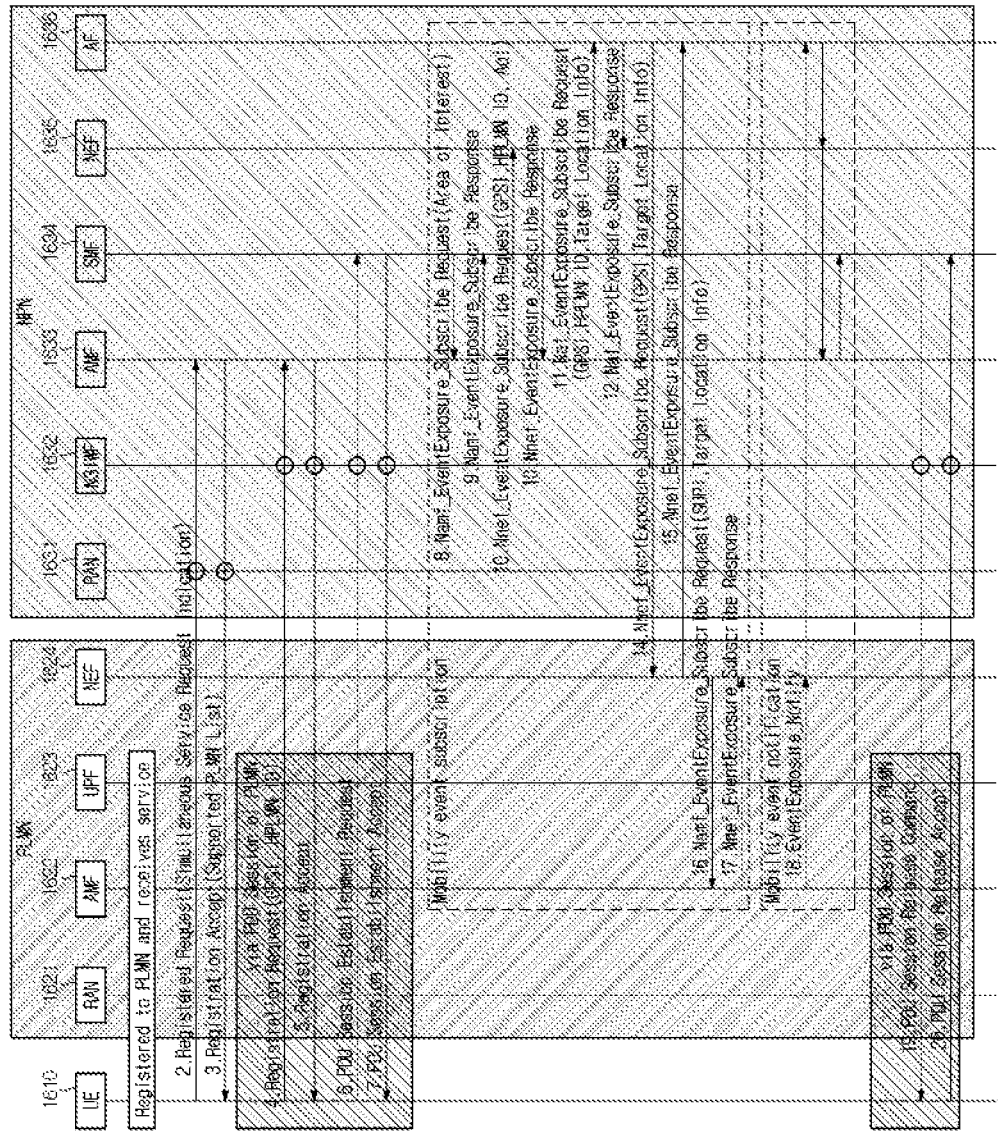
FIG. 16 is a view illustrating a method of accessing an NPN through a PLMN applied to the present disclosure.

FIG. 16 is a view showing a method for a terminal to access an NPN through a PDU session of a PLMN in accordance with an embodiment of the present disclosure. As an example, referring to FIG. 16, a terminal 1610 may receive a VIAPA service through an NPN. Herein, a VIAPA service is a service based on audio and video and may require a high-level support of QoA. In addition, an NPN may provide a VIAPA service only to terminals within the coverage of the NPN. That is, an NPN may provide a data service only to terminals in a specific area and not provide the data service to terminals out of coverage. Herein, the terminal 1610 may be registered to only one network of a PLMN and an NPN based on a single radio. In case the terminal 1610 wants to receive a service simultaneously from a PLMN and an NPN, the terminal 1610 may be registered to the PLMN and be registered to the NPN through an N3IWF by using a PDU session of the PLMN. Thus, the terminal 1610 may receive services from the PLMN and the NPN.

Herein, as an example, since a VIAPA service needs to be supported by a high-level QoS, the terminal 1610 needs to select and be registered to a PLMN supported by a QoS of an NPN based on an SLA between the PLMN and the NPN.

In addition, as an example, an NPN needs to provide a VIAPA only to the terminal 1610 within NPN coverage, but in case the terminal 1610 is registered to the NPN through an N3IFWF, the NPN may not recognize location information of the terminal 1610. Accordingly, an NPN needs to acquire location information of a terminal from a PLMN. In case the terminal 1610 is registered to an NPN through an N3IFWF, the NPN may acquire an identifier (e.g., GPSI) of the terminal while the terminal is being registered to the NPN. Thus, the NPN may check whether or not the terminal 1610 is located within coverage of the NPN.

As a concrete example, in FIG. 16, the terminal 1610 may perform registration to a PLMN for 3GPP access and receive a data service through the PLMN. At this time, the terminal may perform registration based on AMF 1622 and UPF 1623 entities through a RAN 1621 of the PLMN. Then, in case the terminal moves to the coverage of an NPN and retrieves the NPN, the terminal may deliver a first registration message to the NPN. As an example, a first registration request message may be a message for indicating that a terminal wants to receive a service through an NPN while receiving a service through a PLMN. Herein, a first registration request message may be delivered to an AMF 1633 of an NPN via an RAN 1631 of the NPN. The AMF 1633 of the NPN may transmit, as a response to the first registration request message, a registration approval message including a PLMN list to the terminal 1610. The PLMN list supported herein may be a list of PLMN that is supported by a QoS based on an SLA between the PLMN and the NPN. In case the terminal accesses the NPN through an N3IWF 1632 by using a PDU session of the PLMN, the terminal may access the NPN through a PLMN in a list of PLMNs for which a QoS can be supported. To this end, the NPN AMF 1633 may provide a PLMN list, which is supported based on NPN registration indication information transmitted by the terminal 1610, to the terminal 1610.

As another example, an NPN may provide a terminal with a PLMN list that is supported even when registration indication information is not received which indicates that the terminal wants to receive a service through the NPN while receiving a service through the PLMN. That is, an NPN may provide the terminal 1610 with a PLMN list which is supported even when there is no request of the terminal 1610.

As an example, an NPN may check a QoS based on an SLA with a PLMN and provide a PLMN list to a terminal based on a specific interval. In addition, as an example, an NPN may deliver PLMN list information supported based on a broadcasting scheme to terminals within coverage of the NPN, and the terminals within coverage may identify a PLMN list which is supported even when no request message is delivered to the NPN.

As another example, a PLMN list supported based on an NPN may be pre-configured in a terminal. A terminal may check whether or not an NPN is accessible through a session of a PLMN that is accessed based on a pre-configured PLMN list. As another example, a terminal may store and reuse supported PLMN list information, which was received before, but is not limited to the above-described embodiment.

As another example, it is possible to consider a case in which a terminal performs roaming. Herein, the terminal may check whether or not a PLMN ID of an HPLMN is included in a supported PLMN list, without checking a PLMN ID of a roamed serving PLMN. As an example, since a PDU session may be generated by home routed, it is possible to identify a PLMN list which is supported based on a QoS that is based on an SLA between an NPN and an HPLMN.

As another example, only when both a roamed serving PLMN and an HPLMN are included in a supported PLMN list, the terminal 1610 may perform registration to an NPN through the PLMN. In addition, as an example, a lot of PLMN information may be needed to provide a supported PLMN list by considering a roaming terminal in an NPN, and an overhead may occur. In consideration of what is described above, a terminal may further provide ID information (e.g., a subscription concealed identifier (SUCI)/a subscription permanent identifier (SUPI)/a generic public subscription identifier (GPSI)) used in its HPLMN, while performing registration to an NPN. In case an NPN provides a supported PLMN list to a terminal, the NPN may selectively provide only necessary information by considering corresponding HPLMN ID information. In addition, as an example, an NPN may provide the terminal 1610 with information itself regarding whether or not there is an SLA, without providing a supported PLMN list, but is not limited to the above-described embodiment.

As described above, the terminal 1610 may identify a PLMN, which can access an NPN, based on information on a supported PLMN list. Then, the terminal may perform registration to a PLMN included in the supported PLMN list and perform registration to an NPN through N3IWF 1632 of the NPN by using a PDU session of the registered PLMN. Herein, the terminal 1610 may transmit a second registration request message to the NPN through N3IWF 1632 of the NPN via the PDU session of the PLMN. Herein, the second registration request message may include ID information of the terminal. As an example, ID information of a terminal may be a GPSI. In addition, as an example, ID information of a terminal may further a GPSI and an associated HPLMN ID. However, in case a GPSI has a network access identifier (NAI) form, since an HPLMN ID can be known by the GPSI alone, the HPLMN ID may be omitted.

As another example, while receiving a service through a PLMN, the terminal 1610 may transmit at least any one or more of a GPSI and an HPLMN ID in a first registration indication message as registration indication information indicating that the terminal wants to receive a service through an NPN while receiving a service through a PLMN.

Herein, at least any one or more of the GPSI and the HPLMN ID may replace the above-described NPN registration indication. That is, in case the terminal 1610 transmits at least any one or more of a GPSI and an HPLMN ID to an NPN, the terminal 1610 may indicate that it wants to receive a service through an NPN while receiving a service through a PLMN.

As another example, the terminal 1610 may not transmit the above-described first registration request message to an NPN and not receive a corresponding response. That is, the above-described process of transmitting a first registration request message may be omitted. Herein, the terminal 1610 may include information indicating that it wants to use PLMN and NPN services simultaneously in a second registration request message and transmit the second registration request message to an NPN. Then, the NPN may transmit information on a supported PLMN list to the terminal 1610 as a response to the second registration request message. Based on the received PLMN list information, the terminal 1610 may determine whether or not to establish a PDU session connection to the NPN through a PLMN.

As an example, in case a PLMN, which the terminal 1610 has accessed, is not included in supported PLMN list information, the terminal 1610 may access an NPN and then be registered to a PLMN by using an N3IWF of the PLMN through a PDU session of the NPN. To this end, the terminal may hand over from the PLMN to the NPN and receive a service through what is described above. However, in case no handover is allowed based on an operator or a local policy or in case the PLMN does not include the N3IWF entity, the terminal may not receive service simultaneously through the NPN and the PLMN. Herein, the terminal may select any one of an NPN service and a PLMN service based on a priority order. As an example, in the above-described situation, the terminal 1610 may select a preferred service according to a user input through an interaction with a user.

As an example, the terminal 1610 may abandon a PLMN service and receive only an NPN service. As another example, even when there is no SLA between a PLMN and an NPN and thus no sufficient QoS is ensured, the terminal 1610 may access an NPN service through a PLMN PDU session and may not be limited to the above-described embodiment.

On the other hand, in case a PLMN, which the terminal 1610 has accessed, is included in a PLMN list supported by an NPN, the terminal 1610 may transmit an establishment request for a PDU session of the NPN to the SMF 1634 of the NPN through the N3IWF 1632 of the NPN by using a PDU session of the PLMN. The AMF 1633 of the NPN may provide the SMF 1634 of the NPN with information indicating that the terminal 1610 accesses through N3IWF 1632. As another example, the AMF 1633 of an NPN may not transmit any separate indication information to the SMF 1634 of the NPN. Herein, as an example, access type information of information directly requesting a PDU session through an NPN may be different from access type information of information requesting a PDU session through N3IWF 1632. That is, the SMF 1634 of an NPN may recognize, based on access type information, that a terminal has accessed through N3IWF 1632. Then, the terminal 1610 may receive a response from the SMF 1634 of an NPN based on a PDU session establishment request of the NPN and completely establish a PDU session of the NPN.

Herein, as an example, a data service (e.g., VIAPA) provided by an NPN may be provided only to the terminal 1610 within the coverage of the NPN. Accordingly, in order to check whether or not the terminal 1610 is located within the coverage (or service area) of an NPN, the SMF 1634 of the NPN may perform area of interest (AOI) mobility subscription and thus identify the location of the terminal 1610.

As an example, based on indication information or access type information sent from the AMF 1633 of an NPN, the SMF 1634 of the NPN may perform AOI mobility subscription only when the terminal 1610 accesses through N3IWF 1632. The SMF 1634 of the NPN may transmit an AOI mobility subscription request to the AMF 1633 of the NPN, and the AMF 1633 of the NPN may transmit an ACK message to the SMF 1634 of the NPN.

Herein, the AMF 1633 of the NPN may subscribe to the mobility of the terminal through an NEF 1635 of the NPN. As an example, the AMF 1633 of NPN may provide the NEF 1635 of NPN with at least any one of a GPSI, an HPLMN ID, and an AOI of the terminal 1610, which are received from the terminal 1610. Herein, the NEF 1635 may match target location information (e.g., civic addresses, TA list) to an AOI and deliver a GPSI (and an HPLMN ID) to the AF 1636 of NPN in order to provide as a mobility subscription event. Herein, the AF 1636 of NPN may retrieve the NEF 1624 of PLMN through the GPSI (and HPLM ID) and the target location information and subscribe to a mobility event. Herein, the NEF 1624 of PLMN may transmit, to the AMF 1622 of PLMN, a request message for performing mobility subscription for the AMF 1622 of PLMN based on a specific unit level (e.g., TA list, Cell list) for the location information of the AMF 1622 of PLMN and receive a response.

Herein, as an example, the AMF 1622 of PLMN may recognize that the terminal 1610 receives a service of NPN through PLMN, based on the above-described first registration request message or second registration request message. Accordingly, in case the AMF 1622 of PLMN receives a request for AOI, it may be determined whether monitoring for AOI should be performed by PLMN of the terminal or AOI monitoring should be performed in NPN. As another example, an SMF itself may provide a separate indication and perform event subscription for AOI to PLMN of the terminal, without being limited to a specific embodiment.

Herein, in case the terminal gets out of a target location area, the AMF 1622 of PLMN may provide information about being out of the target location area to PLMN NEF 1624. At this time, the notice may be delivered to the SMF 1634 of NPN through the AF 1636 of NPN, the NEF 1635 of NPN, and the AMF 1633 of NPN. The SMF 1634 of NPN may release a PDU session based on being out of the target location area. As another example, the NPN AMF 1633 may release the registration of the terminal 1610 based on the terminal 1610 being out of a target location area but is not limited to the above-described embodiment.

Figure 17:
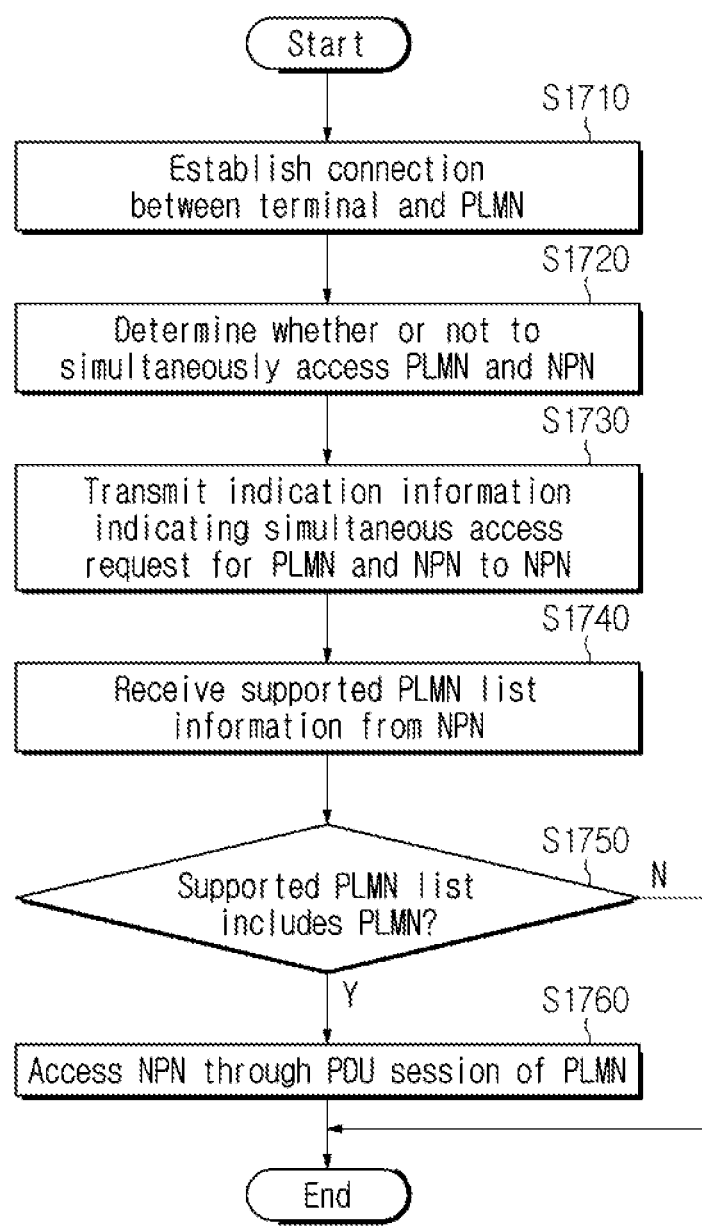
FIG. 17 a view illustrating a flowchart an operation method applied to he present disclosure.

FIG. 17 is a flowchart showing an operating method applicable to the present disclosure.

Referring to FIG. 17, a terminal may establish a connection to a PLMN (S1710). Next, the terminal may determine whether or not to access the PLMN and an NPN simultaneously (S1720) and transmit indication information indicating a PLMN and NPN simultaneously access request to the NPN (S1730). That is, the terminal may want to receive a data service from the NPN at the same time, while receiving a data service from the PLMN, and transmit corresponding indication information to the NPN. Next, the terminal may receive supported PLMN list information from the NPN (S1740). Herein, the supported PLMN list information may be a list that is determined according to whether or not a QoS is supported based on an SLA between the PLMN and the NPN. Herein, as an example, the NPN may transmit the supported PLMN list information of the NPN to the terminal, irrespective of whether or not the indication information indicating a PLMN and NPN simultaneous access request is received from the terminal. That is, even when there is no request from the terminal, the NPN may transmit the supported PLMN list information to the terminal, which is the same as described above. As another example, the supported PLMN list information may be pre-configured in the terminal based on the NPN, which is the same as described above.

Next, in case the supported PLMN list information includes a PLMN to which the terminal is connected (S1750), the terminal may access an NPN through a PDU session of the PLMN (S1760). On the other hand, in case the supported PLMN list information does not include any PLMN to which the terminal is connected (S1750), the terminal may hand over from a PLMN to an NPN and access a PLMN through a PDU session of the NPN. As another example, it is possible to consider a case in which a PLMN does not include a N3IWF or no handover is allowed based on a policy of the PLMN. In this case, the terminal may select and access any one of a PLMN and an NPN based on a priority order, which is the same as described above.

In addition, as an example, in case the terminal access an NPN based on a PDU session of a PLMN, the terminal may transmit, to the NPN, a registration request message including at least any one of a GPSI and an HPLMN ID. Next, when receiving a registration acceptance message from the NPN, the terminal may access the NPN through the PDU session of the PLMN. Herein, as an example, the NPN may allow the access of the terminal based on the coverage of the NPN. That is, the NPN may provide a data service like VIAPA only to terminals within the coverage of NPN. Herein, the NPN may subscribe to an AOI mobility event through a PLMN based on at least any one of the GPSI and HPLMN ID of the terminal. As an example, the NPN may map an AOI to target location information and request mobility event subscription of the terminal to a PLMN based on the AOI. Herein, in case the terminal becomes out of a target location area based on the above-described AOI, a PLMN may provide mobility event information of the terminal to an NPN, and thus the NPN may check whether or not the terminal is located within the coverage.

In addition, as an example, in case the terminal is in a roaming situation, the terminal may access an NPN through a PDU session of a PLMN based on whether or not a HPLMN of the terminal is included in the supported PLMN list information. As another example, as described above, in case the terminal is in a roaming situation, the terminal may access an NPN through a PDU session of a PLMN based on whether or not a HPLMN of the terminal and a serving PLMN, in which the terminal is roaming, are included in the supported PLMN list information.

In addition, as an example, in case a terminal operates based on a single radio, the terminal may access another network through one network, as described above. On the other hand, in case a terminal supports a plurality of radios, the terminal may access each network, which is the same as described above.

As another example, a terminal may include at least one memory coupled with at least one processor in an operable manner and configured to store instructions, when being executed, for the at least one processor to implement a specific operation. Herein, the specific operation may establish a connection to a PLMN, determine whether or not to simultaneously access a PLMN and an NPN, control at least one transceiver to transmit, to an NPN, indication information indicating a PLMN and NPN simultaneous access request, control the at least one transceiver to receive supported PLMN list information from an NPN, and when the supported PLMN list information includes a connected PLMN, access an NPN through a PDU session of a PLMN. Herein, the supported PLMN list may be a list that is determined according to whether or not a QoS is supported based on an SLA between the PLMN and the NPN.

In addition, as an example, it is possible to consider a device that includes at least one memory and at least one processor functionally coupled with the at least one memory. Herein, the at least one processor may establish a connection between the device and a PLMN, determine whether or not to simultaneously access a PLMN and an NPN, control at least one transceiver to transmit, to an NPN, indication information indicating a PLMN and NPN simultaneous access request, control the at least one transceiver to receive supported PLMN list information from an NPN, and when the supported PLMN list information includes a connected PLMN, access an NPN through a PDU session of a PLMN. Herein, the supported PLMN list may be a list that is determined according to whether or not a QoS is supported based on an SLA between the PLMN and the NPN.

In addition, as an example, it is possible to consider a non-transitory computer-readable medium storing at least one instruction. Herein, at least one instruction executable by a processor is included, and the at least one instruction may establish a connection between at least one processor and a PLMN, determine whether or not to simultaneously access a PLMN and an NPN, control at least one transceiver to transmit, to an NPN, indication information indicating a PLMN and NPN simultaneous access request, control the at least one transceiver to receive supported PLMN list information from an NPN, and when the supported PLMN list information includes a connected PLMN, access an NPN through a PDU session of a PLMN, and the supported PLMN list may be a list that is determined according to whether or not a QoS is supported based on an SLA between the PLMN and the NPN.

As the examples of the proposal method described above may also be included in one of the implementation methods of the present disclosure, it is an obvious fact that they may be considered as a type of proposal methods. In addition, the proposal methods described above may be implemented individually or in a combination (or merger) of some of them. A rule may be defined so that information on whether or not to apply the proposal methods (or information on the rules of the proposal methods) is notified from a base station to a terminal through a predefined signal (e.g., a physical layer signal or an upper layer signal).

The present disclosure may be embodied in other specific forms without departing from the technical ideas and essential features described in the present disclosure. Therefore, the above detailed description should not be construed as limiting in all respects and should be considered illustrative. The scope of the present disclosure should be determined by rational interpretation of the appended claims, and all changes within the equivalent scope of the present disclosure are included in the scope of the present disclosure. In addition, claims having no explicit citation relationship in the claims may be combined to form an embodiment or to be included as a new claim by amendment after filing.

What is claimed is:

1. A method for operating an user equipment (UE) based on a plurality of networks in a wireless communication system, the method comprising:
   establishing a connection with a public land mobile network (PLMN);
   transmitting, to the non-public networks (NPN), indication information indicating a simultaneous access request for the PLMN and the NPN based on that UE supporting simultaneously connecting to the NPN and the PLMN;
   receiving, from the NPN, supported PLMN list information; and
   based on the connected PLMN being included in the supported PLMN list information, accessing the NPN through a packet data unit (PDU) session of the PLMN,
   wherein a supported PLMN list which includes list of PLMNs supporting a quality of service (QoS) based on a service level agreement (SLA) between the PLMN and the NPN.

2. The method of claim 1, wherein, based on the connected PLMN not being included in the supported PLMN list information, the UE performs a handover from the PLMN to the NPN and accesses the PLMN through a PDU session of the NPN.

3. The method of claim 2, wherein, based on the PLMN not including N3IWF (Non-3GPP InterWorking Function) or the handover not being allowed based on a policy of the PLMN, the UE selects and accesses only any one of the PLMN and the NPN.

4. The method of claim 3, wherein the UE selects any one of the PLMN and the NPN based on a priority order.

5. The method of claim 1, wherein the UE receives the supported PLMN list information from the NPN, irrespective of whether the indication information indicating the simultaneous access request for the PLMN and the NPN is transmitted to the NPN.

6. The method of claim 1, wherein the supported PLMN list information is pre-configured in the UE based on the NPN.

7. The method of claim 1, wherein, based on the UE accessing the NPN based on the PDU session of the PLMN, the UE transmits, to the NPN, a registration request message including at least any one of a generic public subscription identifier (GPSI) and an HPLMN ID, and
   wherein, based on receiving a registration acceptance message from the NPN, the UE accesses the NPN through the PDU session of the PLMN.

8. The method of claim 7, wherein the NPN allows access of the UE based on coverage of the NPN, and
   wherein the NPN subscribes to a mobility event of the UE to the PLMN based on any one of the GPSI and the HPLMN ID of the UE.

9. The method of claim 8, wherein the NPN maps an area of interest (AOI) to target location information and requests mobility event subscription of the UE to the PLMN based on the AOI.

10. The method of claim 9, wherein, based on the UE being out of a target location area based on the AOI, the PLMN provides mobility event information of the UE to the NPN.

11. The method of claim 1, wherein, based on the UE being in a roaming situation, the UE accesses the NPN through the PDU session of the PLMN based on whether or not an HPLMN of the UE is included in the supported PLMN list information.

12. The method of claim 1, wherein, based on the UE being in a roaming situation, the UE accesses the NPN through the PDU session of the PLMN based on whether or not an HPLMN of the UE and a serving PLMN, in which the UE is roaming, are included in the supported PLMN list information.

13. The method of claim 1, wherein the UE is a UE that supports a single radio.

14. A UE operating in a wireless communication system, the UE comprising:
- at least one transceiver;
- at least one processor; and
- at least one memory which is coupled with the at least one processor in an operable manner and is configured to store instructions that make, when being executed, the at least one processor perform a specific operation,
- wherein the specific operation is configured to:
- establish a connection with a PLMN,
- control the at least one transceiver to transmit, to an NPN, indication information indicating a simultaneous access request for the PLMN and the NPN based on that UE supporting simultaneously connecting to the NPN and the PLMN,
- control the at least one transceiver to receive, from the NPN, supported PLMN list information, and
- based on the connected PLMN being included in the supported PLMN list information, access the NPN through a PDU session of the PLMN, and
- wherein a supported PLMN list which includes list of PLMNs supporting a quality of service (QoS) based on an SLA between the PLMN and the NPN.

15. A network operating in a wireless communication system, the network comprising:
- at least one transceiver;
- at least one processor; and
- at least one memory which is coupled with the at least one processor in an operable manner and is configured to store instructions that make, when being executed, the at least one processor perform a specific operation,
- wherein the specific operation is configured to:
- allow a PLMN to establish a connection with a UE, and
- based on the PLMN connected with the UE being included in supported PLMN list information based on an NPN, and
- allow the UE to access the NPN through an N3IWF of the NPN based on a PDU session of the PLMN, and
- wherein a supported PLMN list which includes list of PLMNs supporting a quality of service (QoS) based on an SLA between the PLMN and the NPN, and
- wherein the UE supports simultaneously connecting to the NPN and the PLMN.

* * * * *